US009942633B2

(12) United States Patent
Cai et al.

(10) Patent No.: US 9,942,633 B2
(45) Date of Patent: Apr. 10, 2018

(54) DISAGGREGATED OPTICAL TRANSPORT NETWORK SWITCHING SYSTEM

(71) Applicants: Biaodong Cai, San Ramon, CA (US); Richard Dunsmore, McKinney, TX (US); Rod Naphan, McKinney, TX (US); Sam Lisle, Fairview, TX (US); Deepak Patel, Moorpark, CA (US); Iqbal Syed, Plano, TX (US)

(72) Inventors: Biaodong Cai, San Ramon, CA (US); Richard Dunsmore, McKinney, TX (US); Rod Naphan, McKinney, TX (US); Sam Lisle, Fairview, TX (US); Deepak Patel, Moorpark, CA (US); Iqbal Syed, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/419,482

(22) Filed: Jan. 30, 2017

(65) Prior Publication Data

US 2017/0311060 A1     Oct. 26, 2017

Related U.S. Application Data

(60) Provisional application No. 62/325,723, filed on Apr. 21, 2016.

(51) Int. Cl.
*H04J 14/00*     (2006.01)
*H04Q 11/00*     (2006.01)
(Continued)

(52) U.S. Cl.
CPC ....... *H04Q 11/0062* (2013.01); *H04L 45/745* (2013.01); *H04L 49/351* (2013.01); *H04Q 11/0066* (2013.01); *H04Q 2011/0073* (2013.01)

(58) Field of Classification Search
CPC .. H04Q 11/0062; H04L 45/745; H04L 49/351
See application file for complete search history.

(56) References Cited

U.S. PATENT DOCUMENTS

| | | | |
|---|---|---|---|
| 2005/0123294 A1 | 6/2005 | Mascolo et al. | |
| 2008/0089693 A1 | 4/2008 | El-Ahmadi et al. | |

(Continued)

FOREIGN PATENT DOCUMENTS

| | | | |
|---|---|---|---|
| EP | 2916496 | | 9/2015 |
| EP | 2958279 | | 12/2015 |
| EP | 3236601 | * | 10/2017 |

OTHER PUBLICATIONS

Extended European Search Report for European Patent Application No. 17167550.7, dated Sep. 20, 2017; 9 pages, dated Sep. 20, 2017.
(Continued)

*Primary Examiner* — Tesfaldet Bocure
(74) *Attorney, Agent, or Firm* — Baker Botts L.L.P.

(57) ABSTRACT

Methods and systems of a disaggregated optical transport network (OTN) switching system that include using plug-in universal (PIU) modules each having multiple ports for OTN to Ethernet transceiving and an Ethernet fabric as a switching core are disclosed. An OTN over Ethernet module in each of the PIU modules may enable various OTN functionality to be realized using the Ethernet fabric which may include multiple Ethernet switches. An ith port of the multiple ports of each PIU module may be connected to the ith Ethernet switch of each of the Ethernet switches. A PIU module may be associated with a respective sequential order of the Ethernet switches. The PIU module may transmit an Ethernet packet from an ith port of the PIU module corresponding to the ith Ethernet switch, where the ith port is selected based on the respective sequential order of the Ethernet switches.

20 Claims, 11 Drawing Sheets

(51) Int. Cl.
*H04L 12/741* (2013.01)
*H04L 12/931* (2013.01)

(56) References Cited

U.S. PATENT DOCUMENTS

| | | |
|---|---|---|
| 2009/0317073 A1 | 12/2009 | Hotchkiss et al. |
| 2011/0255552 A1 | 10/2011 | Ellegard |
| 2012/0063312 A1 | 3/2012 | Sarwar et al. |
| 2013/0136446 A1 | 5/2013 | Hotshkiss et al. |
| 2013/0343747 A1 | 12/2013 | Sarwar et al. |
| 2014/0193146 A1 | 7/2014 | Lanzone et al. |
| 2015/0023368 A1 | 1/2015 | Connolly et al. |
| 2016/0226578 A1 | 8/2016 | Yuan et al. |

OTHER PUBLICATIONS

Office Action received from U.S. Appl. No. 15/419,751, dated Oct. 19, 2017; 24 pages, dated Oct. 19, 2017.
Knudsen-Baas, Per Harald. "OTN switching." Norwegian University of Science and Technology; 140 pages, 2011.
Wikipedia, "Small form-factor pluggable transceiver." https://en.wikipedia.org/wiki/Small_form-factor_pluggable_transceiver; 7 pages, 2016.
Rajesh K, "Data Center Network—Top of Rack (TOR) vs End of Row (EOR) Design." http://www.excitingip.com/2802/data-center-network-top-of-rack-tor-vs-end-of-row-eor-design/; 10 pages, 2016.
Wikipedia, "QSFP." https://en.wikipedia.org/wiki/QSFP; 2 pages, 2016.
Lipscomb, F. "What Is a CFP2-ACO?" https://www.neophotonics.com/what-is-a-cfp2-aco/; 9 pages, 2016.
Hollingsworth, T. "White-Box Switches: Are you Ready?" http://www.networkcomputing.com/networking/white-box-switches-are-you-ready/1465296666; 21 pages, 2014.
Hardy, S. "Fujitsu offers CFP2-ACO coherent optical transceiver." http://www.lightwaveon line.com/articles/2015/03/fujitsu-offers-cfp2-aco-coherent-optical-transceiver.html; 2 pages, 2015.
Fujitsu Limited, "Fujitsu Significantly Expands Its 1FINITY Series of Optical Transmission System Equipment." http://www.fujitsu.com/global/about/resources/news/press-releases/2016/0323-01.html; 5 pages, 2016.
Wikipedia, "C Form-factor Pluggable." https://en.wikipedia.org/wiki/C_Form-factor_Pluggable; 3 pages, 2016.
Wikipedia, "Optical Carrier Transmission Rates." https://en.wikipedia.org/wiki/Optical_Carrier_transmission_rates, 2017; 4 pages, 2017.
Wikipedia, "VT1.5." https://en.wikipedia.org/wik/VT1.5, 2017; 1 page, 2017.
Wikipedia, "Optical Transport Network." https://en.wikipedia.org/wiki/Optical_Transport_Network, 2016; 4 pages, 2016.
Wikipedia, "Synchronous Optical Networking." https://en.wikipedia.org/wiki/Synchronous_optical_networking, 2017; 17 pages, 2017.
International Telecommunication Union, "Interfaces for the Optical Transport Network" ITU-T G.709/Y.1331 (Jun. 2016); 244 pages, Jun. 2016.
International Telecommunication Union, "Architecture of Optical Transport Networks" ITU-T G.872 (Jan. 2017); 68 pages, Jan. 2017.
Wikipedia, "Digital Signal 1" https://en.wikipedia.org/wiki/Digital_Signal_1, 2017; 6 pages, 2017.
Extended European Search Report for European Patent Application No. 17167552.3, dated Sep. 21, 2017; 5 pages, dated Sep. 21, 2017.

\* cited by examiner

DISAGGREGATED OPTICAL TRANSPORT NETWORK SWITCHING SYSTEM

CROSS-REFERENCE TO RELATED APPLICATIONS

This application claims priority from U.S. Provisional Patent Application No. 62/325,723 filed Apr. 21, 2016, entitled "DISAGGREGATED OPTICAL TRANSPORT NETWORK SWITCHING SYSTEM".

BACKGROUND

Field of the Disclosure

The present disclosure relates generally to optical communication networks and, more particularly, to a disaggregated optical transport network switching system.

Description of the Related Art

Telecommunication, cable television and data communication systems use optical transport networks (OTN) to rapidly convey large amounts of information between remote points. In an OTN, information is conveyed in the form of optical signals through optical fibers, where multiple sub-channels may be carried within an optical signal. OTNs may also include various network elements, such as amplifiers, dispersion compensators, multiplexer/demultiplexer filters, wavelength selective switches, optical switches, couplers, etc. configured to perform various operations within the network.

In particular, OTNs may be reconfigured to transmit different individual channels using, for example, optical add-drop multiplexers (OADMs). In this manner, individual channels (e.g., wavelengths) may be added or dropped at various points along an optical network, enabling a variety of network configurations and topologies.

Furthermore, typically, an optical transport network (OTN) switch is used to centrally perform electrical switching of the sub-channels carried within an optical signal to different destinations.

SUMMARY

In one aspect, a disclosed method for switching optical signals as Ethernet packets may include in an optical transport networking (OTN) switching system including an Ethernet fabric having a number M of Ethernet switches. The method may further include assigning a variable i having a value ranging from 1 to M to denote the ith Ethernet switch of the M Ethernet switches, where M is greater than one. The OTN switching system may further include a plurality of plug-in universal (PIU) modules each having M PIU ports including a first PIU module, a second PIU module, and a third PIU module. In the OTN switching system, an ith PIU port of each of the plurality of PIU modules may be connected to the ith Ethernet switch of the Ethernet fabric. The method may further include establishing a first optical data unit (ODU) switched connection from the first PIU module to the third PIU module via the Ethernet fabric and a second ODU switched connection from the second PIU module to the third PIU module via the Ethernet fabric. The method may still further include selecting, for the first PIU module, a first sequential order of the M Ethernet switches. The method may further include selecting, for the second PIU module, a second sequential order of the M Ethernet switches. In the method, the second sequential order may be different from the first sequential order. The method may still further include receiving a first ODU at the first PIU module and generating a first Ethernet packet corresponding to the first ODU, where the first ODU is for transmission via the first ODU switched connection. The method may further include transmitting the first Ethernet packet from a first port of the first PIU module, where the first port may be selected based on the first sequential order. The method may still further include receiving a second ODU at the second PIU module and generating a second Ethernet packet corresponding to the second ODU, where the second ODU is for transmission via the second ODU switched connection. The method may further include transmitting the second Ethernet packet from a second port of the second PIU module, where the second port may be selected based on the second sequential order.

In any of the disclosed embodiments of the method, the first sequential order and the second sequential order may each specify M number of port identifiers respectively associated with the first PIU module and the second PIU module.

In any of the disclosed embodiments of the method, selecting the first sequential order and selecting the second sequential order may be performed at the third PIU module, and may further include sending the first sequential order from the third PIU module to the first PIU module, and sending the second sequential order from the third PIU module to the second PIU module.

In any of the disclosed embodiments, the method may further include receiving a third ODU at the first PIU module. The method may still further include performing, for the first PIU module, a table lookup of an ingress lookup table (ILT) having a plurality of ILT entries to retrieve a first ILT entry associated with the third ODU. The method may further include storing, for the first PIU module, the third ODU at a first location of a first bundling buffer associated with the first ILT entry. The method may still further include receiving a fourth ODU at the first PIU module. The method may further include performing, for the first PIU module, a table lookup of the ILT to retrieve a second ILT entry of the ILT associated with the fourth ODU. The method may still further include storing, for the first PIU module, the fourth ODU at a next in sequence second location of the first bundling buffer associated with the second ILT entry. The method may further include generating, for the first PIU module, a third Ethernet packet corresponding to the third ODU and the fourth ODU at the first bundling buffer associated with the first ILT entry and the second ILT entry.

In any of the disclosed embodiments, the method may further include storing, for the first PIU module, the third Ethernet packet at a first transmit queue for transmission to the third PIU module based on the first sequential order.

In any of the disclosed embodiments, the method may further include retrieving, for the third PIU module, the third Ethernet packet stored at a first receive queue. The method may still further include retrieving, for the third PIU module, the third ODU and the fourth ODU from the third Ethernet packet. The method may further include performing, for the third PIU module, a table lookup of an egress lookup table (ELT) having a plurality of ELT entries to retrieve a first ELT entry associated with the third Ethernet packet.

In any of the disclosed embodiments, the method may further include storing, for the third PIU module, the third ODU and the fourth ODU at a first location of a first re-sequencing buffer associated with the first ELT entry based on a first Ethernet packet sequence number of the third Ethernet packet.

In any of the disclosed embodiments, the method may further include establishing a third optical data unit (ODU) switched connection from the first PIU module to the third PIU module of the plurality of PIU modules via the Ethernet fabric. The method may still further include receiving a third ODU at the first PIU module, where the third ODU is for transmission via the third ODU switched connection. The method may further include transmitting a third Ethernet packet corresponding to the third ODU from a third port of the first PIU module, where the third port may be selected based on a consecutive transmission port count.

In any of the disclosed embodiments of the method, the third ODU switched connection is different than the first ODU switched connection.

In any of the disclosed embodiments of the method, the consecutive transmission port count may be based on consecutive transmissions to a single port.

In another aspect, a disclosed OTN switching system may include an Ethernet fabric having a number M of Ethernet switches, where a variable i having a value ranging from 1 to M to denote the ith Ethernet switch of the M Ethernet switches, where M is greater than one. The OTN switching system may further include a plurality of PIU modules each having M PIU ports including a first PIU module, a second PIU module, and a third PIU module. In the OTN switching system, an ith PIU port of each of the plurality of PIU modules may be connected to the ith Ethernet switch of the Ethernet fabric. The OTN switching system may establish a first ODU switched connection from the first PIU module to the third PIU module via the Ethernet fabric and a second ODU switched connection from the second PIU module to the third PIU module via the Ethernet fabric. The OTN switching system may further select a first sequential order of the M Ethernet switches. The OTN switching system may still further select a second sequential order of the M Ethernet switches. In the OTN switching system, the second sequential order may be different from the first sequential order. The OTN switching system may further receive a first ODU at the first PIU module and generate a first Ethernet packet corresponding to the first ODU, where the first ODU is for transmission via the first ODU switched connection. The OTN switching system may still further transmit the first Ethernet packet from a first port of the first PIU module, where the first port may be selected based on the first sequential order. The OTN switching system may further receive a second ODU at the second PIU module and generate a second Ethernet packet corresponding to the second ODU, where the second ODU is for transmission via the second ODU switched connection. The OTN switching system may still further transmit the second Ethernet packet from a second port of the second PIU module, where the second port may be selected based on the second sequential order.

In any of the disclosed embodiments of the OTN switching system, the first sequential order and the second sequential order may each specify M number of port identifiers respectively associated with the first PIU module and the second PIU module.

In any of the disclosed embodiments of the OTN switching system, the selection of the first sequential order and the selection of the second sequential order may be performed at the third PIU module. The OTN switching system may further send the first sequential order from the third PIU module to the first PIU module and send the second sequential order from the third PIU module to the second PIU module.

In any of the disclosed embodiments, the OTN switching system may receive a third ODU at the first PIU module. The OTN switching system may further perform a table lookup of an ingress lookup table (ILT) having a plurality of ILT entries to retrieve a first ILT entry associated with the third ODU. The OTN switching system may still further store the third ODU at a first location of a first bundling buffer associated with the first ILT entry. The OTN switching system may further receive a fourth ODU at the first PIU module. The OTN switching system may still further perform the table lookup of the ILT to retrieve a second ILT entry associated with the fourth ODU. The OTN switching system may further store the fourth ODU at a next in sequence second location of the first bundling buffer associated with the second ILT entry. The OTN switching system may still further generate a third Ethernet packet corresponding to the third ODU and the fourth ODU at the first bundling buffer associated with the first ILT entry and the second ILT entry.

In any of the disclosed embodiments, the OTN switching system may store the third Ethernet packet at a first transmit queue for transmission to the third PIU module based on the first sequential order.

In any of the disclosed embodiments, the OTN switching system may retrieve the third Ethernet packet stored at a first receive queue. The OTN switching system may further retrieve the third ODU and the fourth ODU from the third Ethernet packet. The OTN switching system may still further perform a table lookup of an egress lookup table (ELT) having a plurality of ELT entries to retrieve a first ELT entry associated with the third Ethernet packet.

In any of the disclosed embodiments, the OTN switching system may store the third ODU and the fourth ODU at a first location of a first re-sequencing buffer associated with the first ELT entry based on a first Ethernet packet sequence number of the third Ethernet packet.

In any of the disclosed embodiments, the OTN switching system may establish a third optical data unit (ODU) switched connection from the first PIU module to the third PIU module via the Ethernet fabric. The OTN switching system may further receive a third ODU at the first PIU module, where the third ODU is for transmission via the third ODU switched connection. The OTN switching system may still further transmit a third Ethernet packet corresponding to the third ODU from a third port of the first PIU module, where the third port may be selected based on a consecutive transmission port count.

In any of the disclosed embodiments of the OTN switching system, the third ODU switched connection is different than the first ODU switched connection.

In any of the disclosed embodiments of the OTN switching system, the consecutive transmission port count may be based on consecutive transmissions to a single port.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
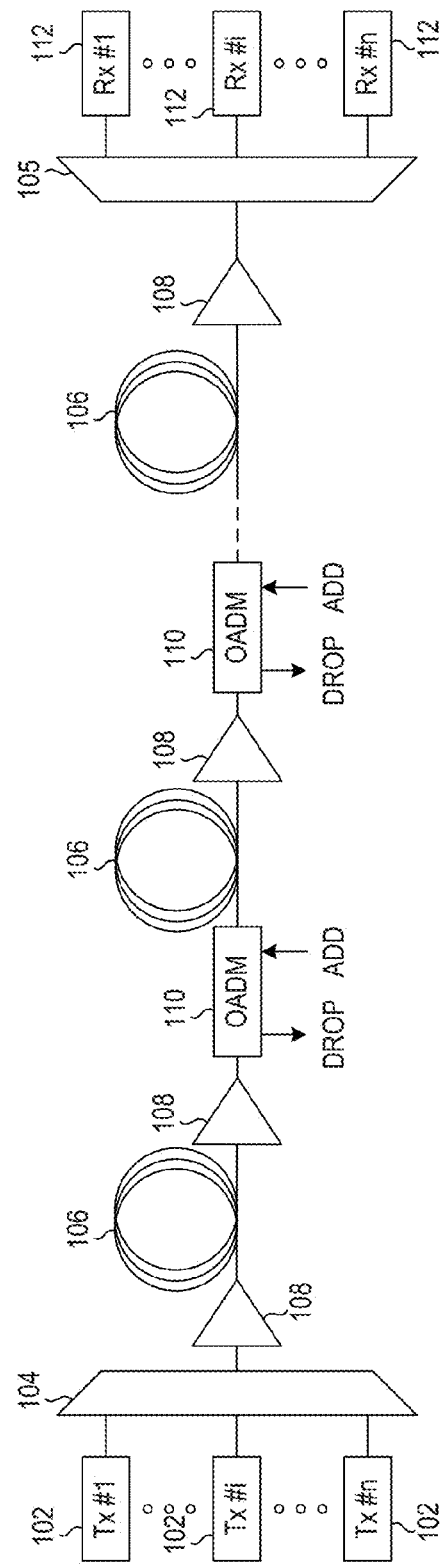
FIG. 1 is a block diagram of selected elements of an embodiment of an optical transport network (OTN)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Turning now to the drawings, FIG. 1 illustrates an example embodiment of an optical transport network 101, which may represent an optical communication system. Optical transport network 101 may include one or more optical fibers 106 configured to transport one or more optical signals communicated by components of optical transport network 101. The network elements of optical transport network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical transport network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical transport network 101 may include devices configured to transmit optical signals over optical fibers 106. Information may be transmitted and received through optical transport network 101 by modulation of one or more wavelengths of light to encode the information on the wavelength. In optical networking, a wavelength of light may also be referred to as a channel. Each channel may be configured to carry a certain amount of information through optical transport network 101.

To increase the information capacity and transport capabilities of optical transport network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may be configured to transmit disparate channels using WDM or some other suitable multi-channel multiplexing technique, and to amplify the multi-channel signal.

Optical transport network 101 may include one or more optical transmitters (Tx) 102 configured to transmit optical signals through optical transport network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical (O-E) or electro-optical (E-O) conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical transport network 101 via fibers 106. OADMs 110 comprise an add/drop module, which may include a system, apparatus or device configured to add or drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels.

In FIG. 1, optical transport network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS), which handles one or more network elements from the perspective of the elements, a network management system (NMS), which handles many devices from the perspective of the network, and an operational support system (OSS), which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical transport network 101.

As shown in FIG. 1, optical transport network 101 may employ a digital wrapper technology to encapsulate existing frames of data, which may originate in a variety of native protocols, and may add packetized overhead for addressing, management, and quality assurance purposes. The resulting optical signal, in the form of optical data units (ODUs) may then be transported using individual optical wavelengths by optical transport network 101. The packetized overhead may be used to monitor and control the optical signals being transported using any of a variety of different protocols. In particular embodiments, operation of optical transport network 101 is performed according to optical transport networking (OTN) standards or recommendations promulgated by the International Telecommunications Union (ITU), such as ITU-T G.709—"Interfaces for the Optical Transport Network" and ITU-T G.872—"Architecture of the Optical Transport Network", among others. The optical wavelengths in OTN may rely on a hierarchical implementation of time-division multiplexing (TDM) to optimize carrier wavelength efficiency.

As a result of the hierarchical TDM arrangement of the optical signals in OTN, OTN switching may be performed at different sub-wavelength bit rates along optical transport network 101. As used herein, OTN switching refers to switching ODU paths of different bit rates with the ODU being the atomic unit of switching. In contrast, Internet protocol (IP) switching, such as by an IP router, refers to switching of network signals where an individual IP packet is the atomic unit of switching. In OTN switching, such as in optical transport network 101, an ODU remains in the optical domain outside of an OTN switch from network ingress to network egress. Within the OTN switch, an ODU may be accessed as an electrical domain object and OTN switching may include electrical switching technology.

It is noted that while OTN switching does generally take place in the DWDM domain, ROADMs and DWDM may be formally referred to as layer0 technologies (in The Basic Reference Model for Open Systems Interconnection, also referred to as the OSI Reference Model). In contrast, OTN may be described as a layer1 technology in the OSI Reference Model, which may operate independently of the optical wavelength domain (DWDM). For example, an OTN switch may theoretically operate over dark fiber, galvanic conductors (such as copper), or over a wireless medium (such as a millimeter-scale wave, or radio frequencies).

In general, the term "distributed" may refer to multiple nodes, or network elements (NEs), interconnected by a network and a set of collaborating nodes (or NEs). As used herein, the term "disaggregated" may refer to a NE in a distributed network that is further reorganized into a set of disaggregated sub-components in a physical sense, as compared to an aggregated physical structure, while maintaining the functionality of an integrated NE in a logical sense. In some embodiments, the disaggregated sub-components may be made openly accessible, in contrast to the aggregated physical structure.

In contrast to the centralized and embedded nature of an OTN switch, which is a unitary device at a single central location, a disaggregated OTN switching system is disclosed herein. The disaggregated OTN switching system disclosed herein may enable disaggregation of the core switching functionality with the network interface functionality. The disaggregated OTN switching system disclosed herein may enable OTN switching by relying on an internal Ethernet switching core (also referred to herein as an "Ethernet fabric"). The disaggregated OTN switching system disclosed herein may accordingly enable rapid customized configuration of a particular switching functionality at a particular location or at different remote locations. The disaggregated OTN switching system disclosed herein may enable much lower cost OTN switching than by using an OTN switch. The disaggregated OTN switching system disclosed herein may enable a much greater scalability as compared to the fixed switching capacity that is inherent in an OTN switch, because the Ethernet fabric employed may be external network infrastructure, such as data center switching systems, that can be expanded to a desired capacity. The disaggregated OTN switching system disclosed herein may be implemented using a plurality of plug-in universal (PIU) modules that provide interfacing and transceiving functionality between various OTN signals and Ethernet signals. The disaggregated OTN switching system disclosed herein may be further implemented using PIU blade chassis that have interface slots populated by a number of PIU modules, which are interconnected, powered, and controlled using the PIU blade chassis. Certain ones of PIU modules disclosed herein may enable localized direct OTN switching functionality by interconnecting two or more PIU modules in a loop-back configuration, without the use of a core Ethernet fabric.

Figure 2:
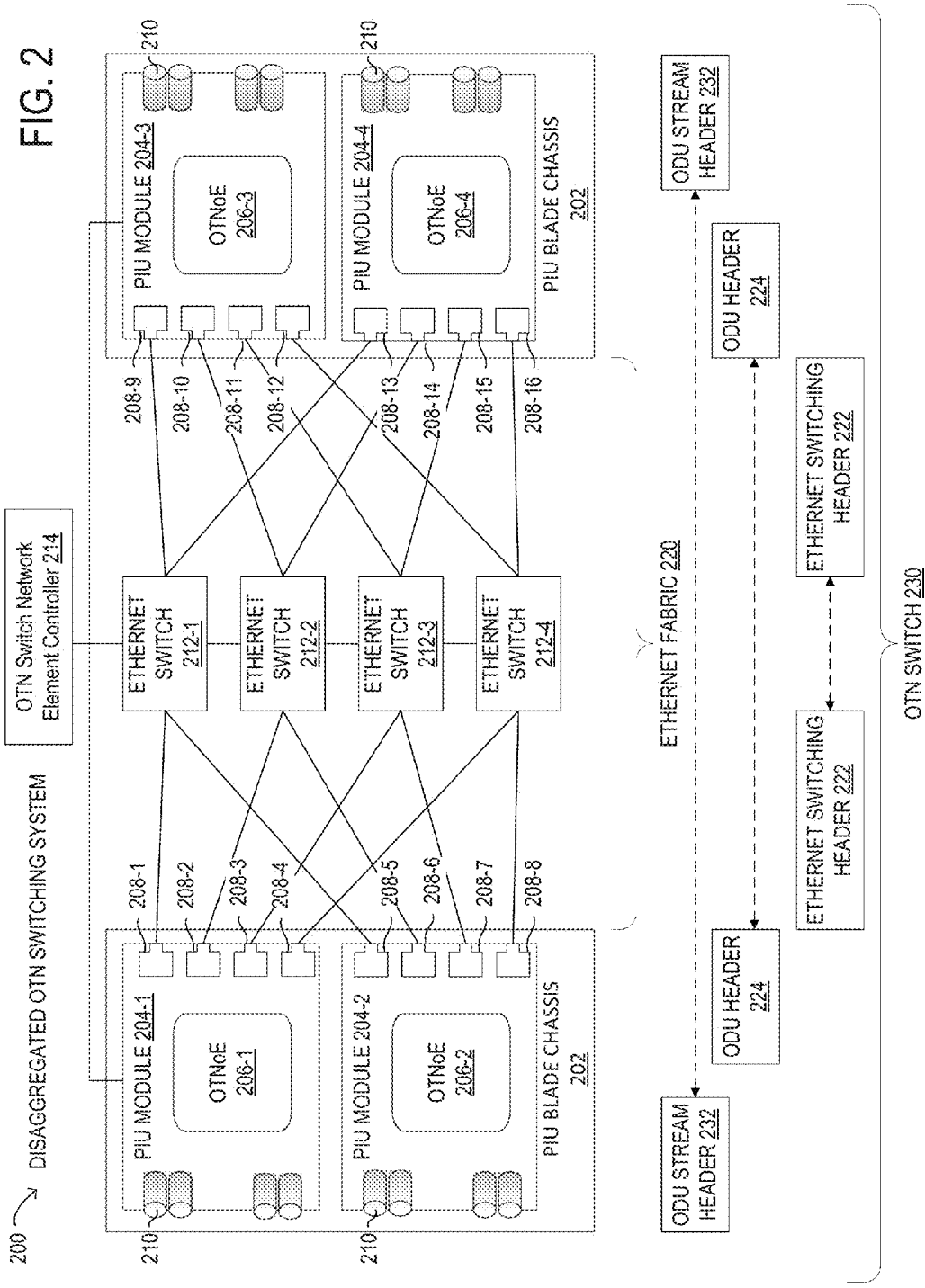
FIG. 2 is a block diagram of selected elements of an embodiment of a disaggregated OTN switching system.

Referring now to FIG. 2, a block diagram of selected elements of an embodiment of a disaggregated OTN switching system 200 is illustrated. Disaggregated OTN switching system 200 in FIG. 2 may be implemented for external switching of optical signals associated with optical transport network 101 (see FIG. 1) and is a schematic diagram for descriptive purposes and is not drawn to scale or perspective. External switching of optical signals refers to switching ODU paths of different bit rates with an ODU being the atomic unit of switching, where the different bit rates may be sub-wavelength bit rates, and the ODU remains in the optical domain outside of an OTN switch 230 from network ingress to network egress. It is noted that within disaggregated OTN switching system 200, an ODU may be accessed as an electrical domain object and OTN switching may include electrical switching technology.

As shown in FIG. 2, disaggregated OTN switching system 200 is configured to function as OTN switch 230, in which optical signals having optical data unit (ODU) stream headers 232 connected to PIU modules 204 may be interconnected and logically switched among PIU modules 204. At the core of disaggregated OTN switching system 200 is an Ethernet fabric 220. Each of PIU modules 204 may function as a transceiver, with OTN inputs and outputs 210 (shown as cylindrical ports) being respectively converted from ODUs each having an ODU header 224 to Ethernet packets each having an Ethernet switching header 222 that are then switchable by one or more Ethernet switches 212. Ethernet fabric 220 may employ Ethernet switches 212 in any kind of Ethernet switching architecture or Ethernet switching domain. In various embodiments, Ethernet fabric 220 may be implemented as a hierarchical spine-leaf architecture, which has become commonplace in many data center rack domains. Thus, each rack may have a so-called top-of-rack (TOR) leaf switch that operates at a relative low data throughput capacity, while the TOR leaf switches are then interconnected using a spine switch that operates at a relatively high data throughput capacity. In this manner, Ethernet fabric 220 may be hierarchically implemented using different numbers of TOR leaf switches and spine switches for any given network switching application, including aggregation into very large throughput Ethernet fabrics 220 that may have data throughput capacity of several dozens of terabytes, or even greater.

The interconnections between PIU modules 204 and Ethernet fabric 220 may be copper cabled connections, such as 1000BASE-CX, 1000BASE-KX, 1000BASE-T, and 1000BASE-TX for 1 GB Ethernet; such as 10GBASE-CX4, small form factor pluggable+(SFP+), 10GBASE-T, and 10GBASE-KX4 for 10 GB Ethernet; and such as 100GBASE-CR10, 100GBASE-CR4, 100GBASE-KR4, and 100GBASE-KP4 for 100 GB Ethernet, among other potential types of copper-cable based ports. In some embodiments, the interconnections between PIU modules 204 and Ethernet fabric 220 may be optical fiber Ethernet connections that are supported according to a variety of Ethernet standards for optical Ethernet ports. For example, for 100 GB Ethernet interconnections to Ethernet fabric, the interconnections may be any one or more of 100GBASE-SR10, 100GBASE-SR4, 100GBASE-LR4, 100GBASE-ER4, 100GBASE-CWDM4, 100GBASE-PSM4, 100GBASE-ZR, 100GBASE-KR4, and 100GBASE-KP4. For example, for up to 400 GB Ethernet interconnections to Ethernet fabric 220, the interconnections may be any one or more of 400GBASE-SR16, 400GBASE-DR4, 400GBASE-FR8, and 400GBASE-LR8. Furthermore, in certain embodiments, interconnections to Ethernet fabric 220 may utilize FlexEthernet (FlexE) in order to mix different transmission rates across Ethernet fabric 220.

Among the form factors for ports used in PIU modules 204 are quad small form-factor pluggable (QFSP), C form-factor pluggable (CFP, CFP2), and SFP+. For example, on the OTN line side, CFP2 ports supporting analog coherent optics (ACO) may be used in PIU modules 204, such as for 100 gigabit (100G) or 200 gigabit (200G) coherent OTN connections.

Each PIU module 204 in disaggregated OTN switching system 200 is further equipped with an OTN over Ethernet (OTNoE) module 206, respectively, which may be an application specific integrated circuit (ASIC), an ASSP (application specific standard product), or a field-programmable gate array (FPGA) that is customized for a particular purpose. OTNoE module 206 in PIU module 204 may provide specific functionality to enable overall operation of disaggregated OTN switching system 200 as OTN switch 230. OTNoE module 206 may be enabled to implement, in the context of disaggregated OTN switching system 200, various types of OTN functionality over Ethernet fabric 220. OTNoE module 206 may support or enable functionality for OTN path redundancy and path protection switching using Ethernet fabric 220. OTNoE module 206 may support or enable functionality for concatenation of OTN path protection domains. OTNoE module 206 may support or enable functionality for distribution of OTN network paths and ODUs associated with the network paths over a 1:N Ethernet fabric connections, where 1 Ethernet switch 212 is used to protect N other working Ethernet switches 212 in case any one of the N working Ethernet switches 212 has a failure or indicates performance of a maintenance operation that may result in an offline state. Furthermore, both 1:N and 0:N protection schemes may be supported. Given the nature of very high speed switching for both OTN applications and for Ethernet fabrics 220, as well as the cost and complexity of using external memory with OTNoE module 206, a latency delay variation may be experienced among Ethernet switches 212. The latency delay variation (or jitter) by Ethernet fabric 220 may be an important factor to consider when choosing an ODU path distribution scheme and a particular Ethernet fabric 220 when a protection scheme is used. OTNoE module 206 may support or enable functionality for ensuring ODU path and data integrity over Ethernet fabric 220, even when jitter occurs over Ethernet fabric 220. OTNoE module 206 may support or enable functionality for switching higher level ODUs over Ethernet fabric 220, even when the data throughput for the higher level ODUs is larger than the underlying Ethernet ports in Ethernet fabric 220. The OTNoE module 206 may support or enable functionality for compressing OTN traffic to provide more efficient connections to Ethernet fabric 220, while compensating for jitter and bit error rate (BER) losses that may occur over Ethernet fabric 220, in order to enable using Ethernet fabric 220 for OTN switching.

Finally, in FIG. 2, an OTN switch network element controller 214 (see also FIGS. 3 and 4) is shown that coordinates operation of PIU blade chassis 202, PIU modules 204, and Ethernet fabric 220. OTN switch network element controller 214 may be a software-defined networking (SDN) controller, a micro-controller unit (MCU), a virtual micro-controller unit (vMCU), or various types of controllers. Specifically, functionality in the OTN switch network element controller 214 may be used to communicate with PIU chassis 202 and Ethernet fabric 220 for OTN switching operations. The OTN switch network element controller 214 may accordingly configure switching paths and switching configurations, using software commands, to enable operation of disaggregated OTN switching system 200 as an OTN switch 230.

Figure 3:
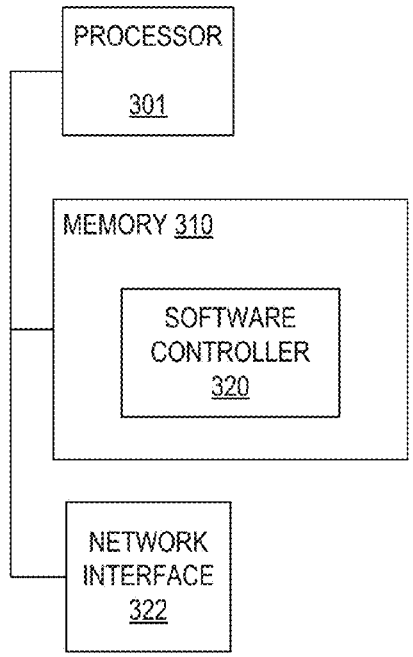
FIGS. 3 and 4 are block diagrams of selected elements of an embodiment of an OTN switch network element controller.

Referring now to FIG. 3, a block diagram of selected elements of an embodiment of OTN switch network element controller 300 is illustrated. OTN switch network element controller 300 in FIG. 3 may be implemented to control disaggregated OTN switching system 200 (see FIG. 2) and is a schematic diagram for descriptive purposes.

In FIG. 3, OTN switch network element controller 300 is represented as a computer system including physical and logical components for implementing disaggregated OTN switching system 200, as described herein, and may accordingly include processor 301, memory 310, and network interface 322. Processor 301 may represent one or more individual processing units and may execute program instructions, interpret data, process data stored by memory 310 or OTN Switch Network Element Controller 300. It is noted that OTN switch network element controller 300 may be implemented in different embodiments. For example, in some embodiments, OTN switch network element controller 300 may be implemented using a network element. In particular embodiments, memory 310 may represent a software controller 320 executing on processor 301.

In FIG. 3, memory 310 may be communicatively coupled to processor 601 and may comprise a system, device, or apparatus suitable to retain program instructions or data for a period of time (e.g., computer-readable media). Memory 310 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 310 may include different numbers of physical storage devices, in various embodiments. As shown in FIG. 3, memory 310 may include software controller 320, among other applications or programs available for execution.

Figure 4:
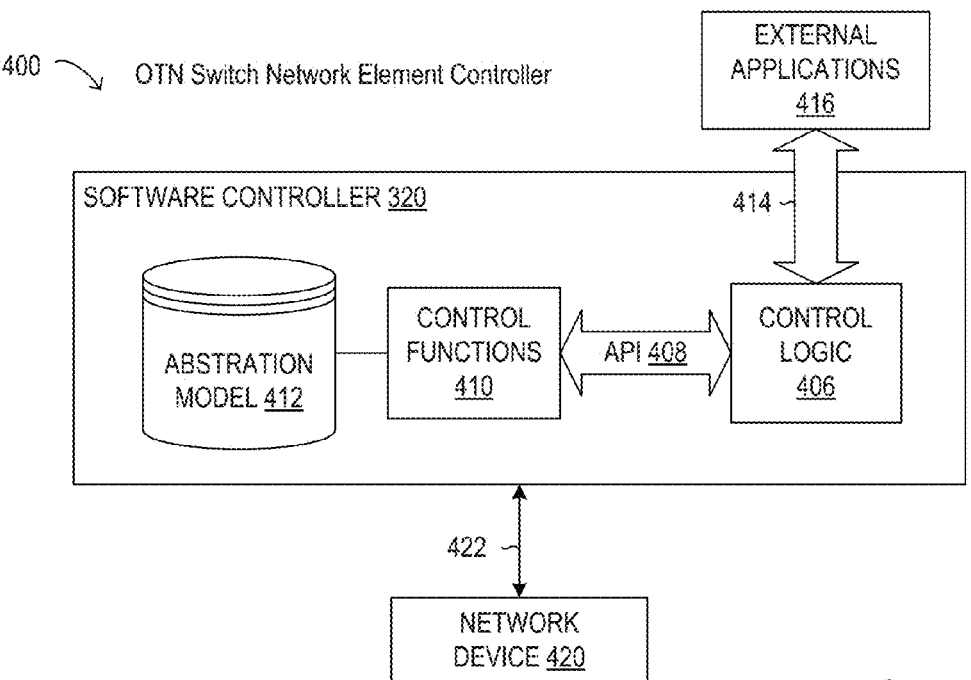

Referring now to FIG. 4, a block diagram of selected elements of an embodiment of OTN switch network element controller 400 is illustrated. FIG. 4 shows further details of software controller 320 for performing SDN operations related to disaggregated OTN switching system 200, as described above.

In FIG. 4, software controller 320 is shown including a repository that may store any of various different abstraction models 412, selected as examples among other abstraction models for descriptive clarity. In some embodiments, abstractions models 412 are defined using YANG, which is a data modeling language for modeling configuration and state data used to manage network devices through a network configuration protocol (NETCONF). Specifically, abstraction model 412 may include a service abstraction model that may model configuration and state data for network services used with optical transport network 101. Abstraction model 412 may include a network abstraction model that may model configuration and state data for network connections used with optical transport network 101. Abstraction model 412 may include a device abstraction model that may model configuration and state data for network devices 420 used in optical transport network 101. Control functions 410 may represent various control functions for network services, network connections, and network devices 420. API 408 may enable control logic 406 to access control functions 410 for network services, network connections, and network devices 420.

As shown in OTN switch network element controller 400, API 414 may enable communication between control logic 406, as well as external applications 416. Some non-limiting examples of external applications 416 that may be used with software controller 320 include orchestrators (NCX, Anuta Networks, Inc., Milpitas, Calif., USA; Exanova Service Intelligence, CENX, Ottawa, Canada), workflow managers (Salesforce Service Cloud, salesforce.com, Inc., San Francisco, Calif., USA; TrackVia, TrackVia, Inc., Denver, Colo., USA; Integrify, Integrify Inc., Chicago, Ill., USA); and analytics applications (Cloud Analytics Engine, Juniper Networks, Inc., Sunnyvale, Calif., USA; Nuage Networks Virtualized Services Directory (VSD), Nokia Solutions and Networks Oy, Espoo, Finland).

In implementations of OTN switch network element controller 400, control logic 406 may comprise internal control logic that remains proprietary, internal, or administratively protected within software controller 320. Non-limiting examples of internal or protected portions of control logic 406 may include complex proprietary algorithms, such as for path computation, and private business logic, such as billing algorithms of the network operator. In disaggregated OTN switching system 200, control logic 406 may include functionality for communicating with PIU chassis 202 and Ethernet fabric 220, as described above.

Furthermore, software controller 320 may interact with various network devices 420 using different network protocols. For example, software controller 320 may interact with network device 420 using software protocol 422 that is a NETCONF protocol, a command line interface (CLI), or a simple network management protocol (SNMP). Network devices 420 may represents routers, switches, or network elements that are included in optical transport network 101. As noted above, network abstraction models 412 may be repositories, such as databases with representations of functions supported by software controller 320, while the actual implementation of the functions is performed by control functions 410. Accordingly, control functions 410 may utilize the different software protocols 422 to access network devices 420.

It is noted that network devices 420 and software protocols 422 are shown in a logical view in FIG. 4 not a physical view. The actual physical connections between network devices 420 and software controller 320 may be different in different embodiments, such as using one or more network connections.

Figure 5:
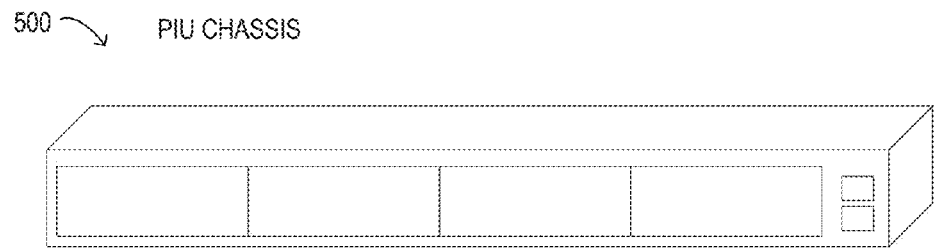
FIG. 5 is a block diagram of selected elements of an embodiment of a PIU chassis.

Referring now to FIG. 5, a representation of selected elements of an embodiment of a PIU chassis 500 is illustrated. PIU chassis 500 may be a rack-mounted enclosure having an internal bus and an internal processor. PIU chassis 500 may receive PIU modules 204 via individual slots that connect PIU module 204 to the internal bus. The internal bus may provide power and coordination among PIU modules 204. In certain embodiments, PIU chassis 500 includes a network connection for direct communication to the OTN switch network element controller 214. As shown PIU chassis 500 has four slots that may be populated with individual PIU modules 204. It is noted that in different embodiments, PIU chassis 500 may be implemented with different numbers of slots and may be implemented in different form factors. It is noted that PIU modules 204 may have front side network connections for access while PIU modules 204 populates a slot in PIU chassis 500.

Figure 6A:
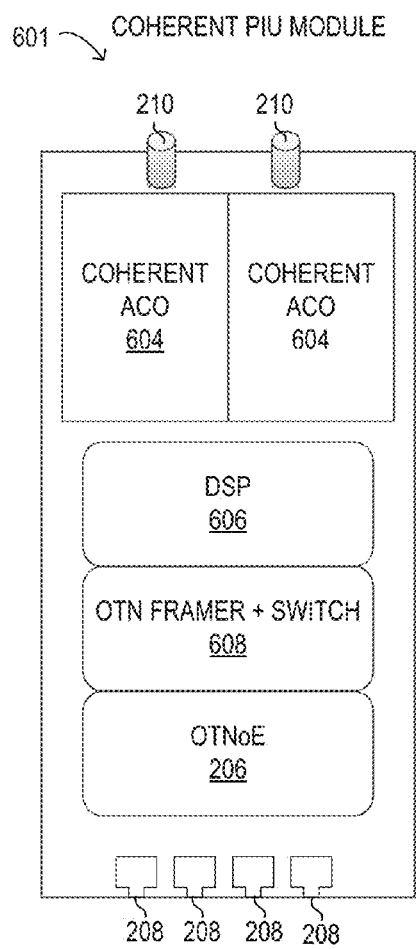
FIGS. 6A, 6B, and 6C are block diagrams of selected elements of embodiments of PIU modules.

Referring now to FIG. 6A, a block diagram of selected elements of an embodiment of a coherent PIU module 601 is illustrated. FIG. 6A is a schematic illustration. Coherent PIU module 601 may populate one slot PIU chassis 500. In the exemplary embodiment shown in FIG. 6A, coherent PIU module 601 is implemented with OTN inputs and outputs 210, two analog coherent optical (ACO) transceivers 604, for example, that support 100G or 200G OTN lines and 100G Ethernet, and a 16×10G Ethernet/4×40G Ethernet port 208, and 100G Ethernet port 208. Coherent PIU module 601 may further include a DSP 606 and an OTN framer+switch 608, along with OTNoE module 206 on the 100G Ethernet side, as described above. Coherent PIU module 601 may include various connector ports for optical or copper wire based connections, as described above.

Figure 6B:
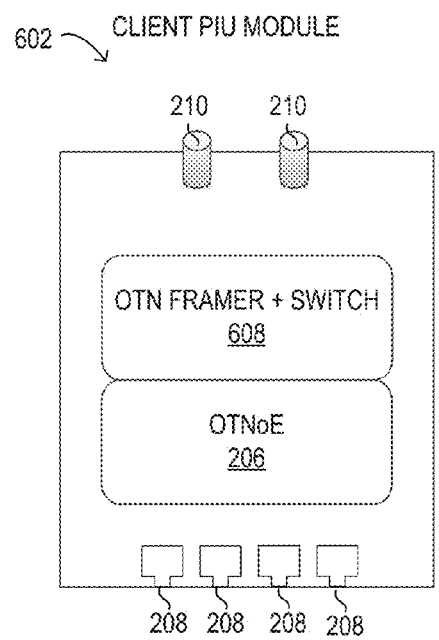

Referring now to FIG. 6B, a block diagram of selected elements of an embodiment of a client PIU module 602 is illustrated. FIG. 6B is a schematic illustration. Client PIU module 602 may populate one slot in PIU chassis 500. In the exemplary embodiment shown in FIG. 6B, client PIU module 602 is implemented with OTN inputs and outputs 210, a 16×10G Ethernet/4×40G Ethernet port 208, and 100G Ethernet port 208. Client PIU module 602 may further include OTN framer+switch 608, along with OTNoE module 206 on the 100G Ethernet side, as described above. Client PIU module 602 may include various connector ports for optical or copper wire based connections, as described above.

Figure 6C:
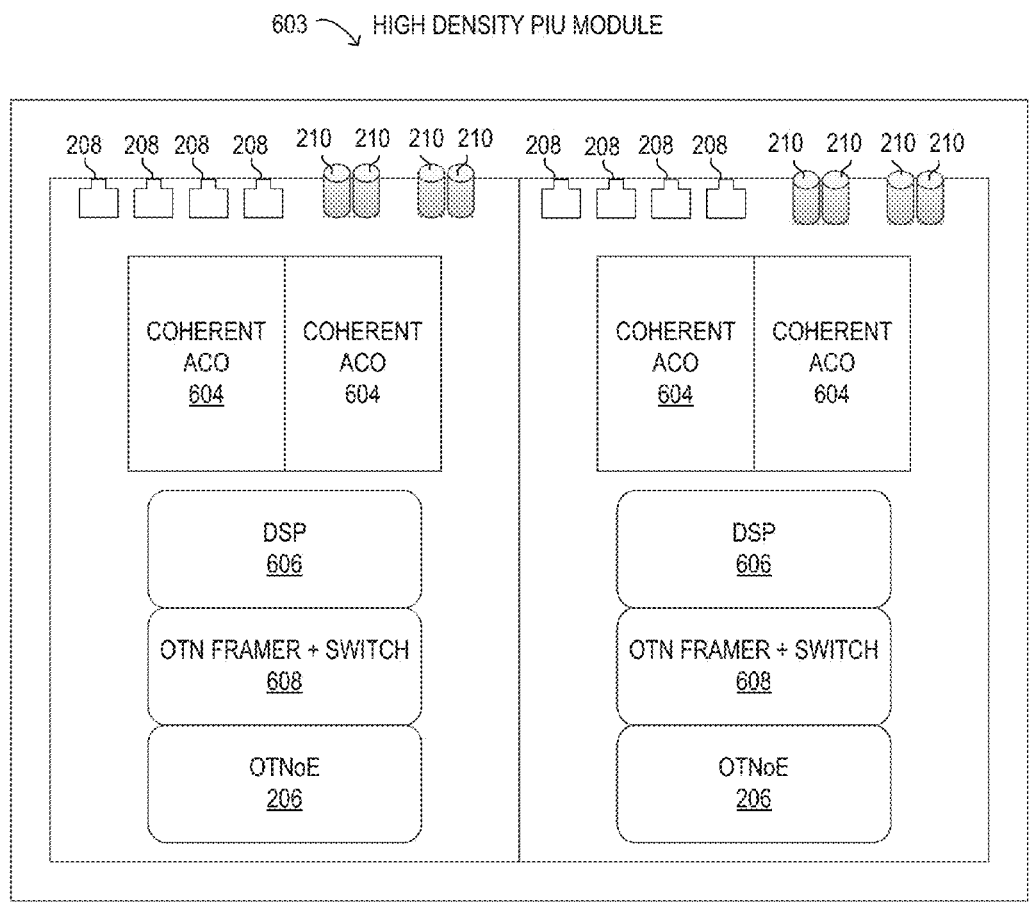

Referring now to FIG. 6C, a block diagram of selected elements of an embodiment of a high density PIU module 603 is illustrated. FIG. 6C is a schematic illustration. High density PIU module 603 may populate two slots in PIU chassis 500. In the exemplary embodiment shown in FIG. 6C, high density PIU module 603 is implemented with two submodules that may be similar to coherent PIU module 601, but where each sub-module may support 2×100G OTN lines having OTN inputs and outputs 210. High density PIU module 603 may further include two analog coherent optical (ACO) transceivers 604, 1×40 G Ethernet/10×10G Ethernet client ports 208, 16×10G Ethernet ports 208, two DSPs 606 and two OTN framer+switches 608, along with two OTNoE modules 206 on the 100G Ethernet side, as described above. High density PIU module 603 may include various connector ports for breaking out various optical or copper wire based connections, as described above.

Figure 7A:
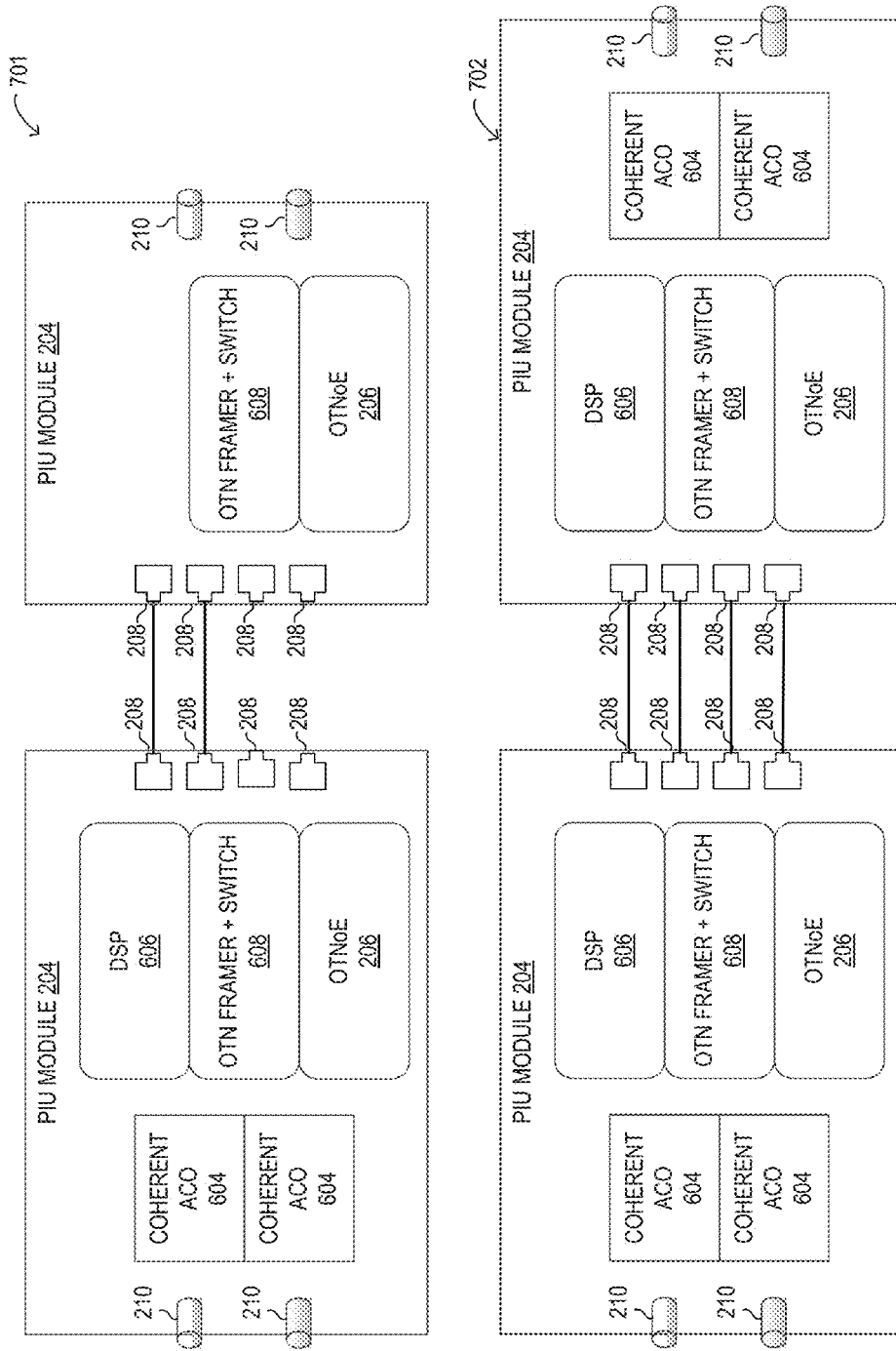
FIGS. 7A and 7B are a block diagrams of selected elements of an embodiment of local OTN switching functionality.
Figure 7B:
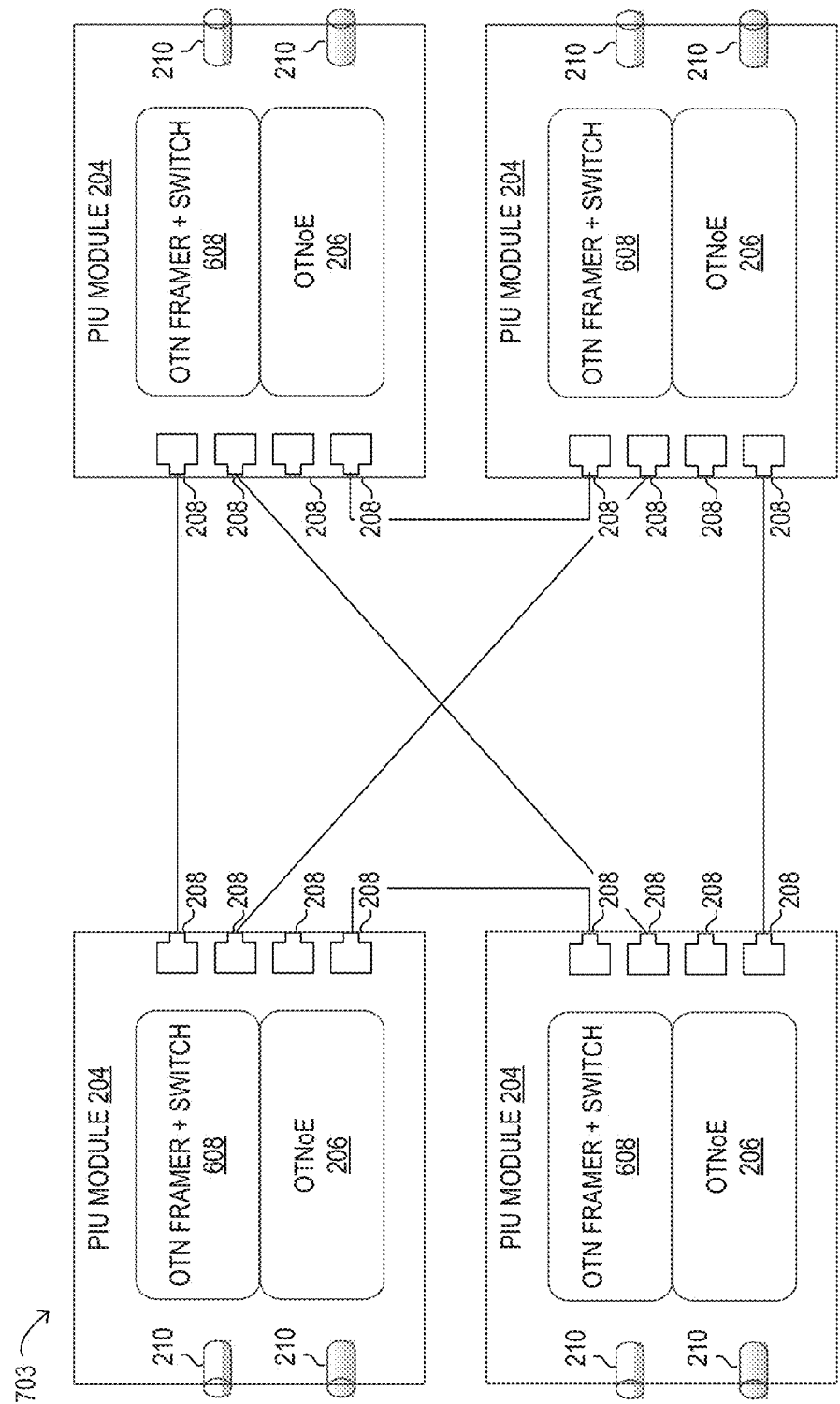

Referring now to FIG. 7A, a block diagram of selected elements of an embodiment of local switching configurations using two directly interconnected PIU modules 604 without a core Ethernet fabric 220 are shown. In the configurations shown in FIG. 7A, the OTN framer+switch 608 may perform OTN switching, along with OTNoE modules 206 among the connected modules. Although certain direct connections are shown in FIG. 7A, it will be understood that local switching configurations using PIU modules 204 may utilize internal connections as well as mesh connection configurations, in which 3 or 4 PIU modules 204 are directly interconnected to enable cross-connections for all participants in the mesh. For example, FIG. 7B illustrates a block diagram of selected elements of an embodiment of local switching using four directly interconnected PIU modules 204 without a core Ethernet fabric 220. In this manner, certain local OTN bi-directional switching functionality using multiple switching nodes may be realized with low complexity and cost.

Figure 8:
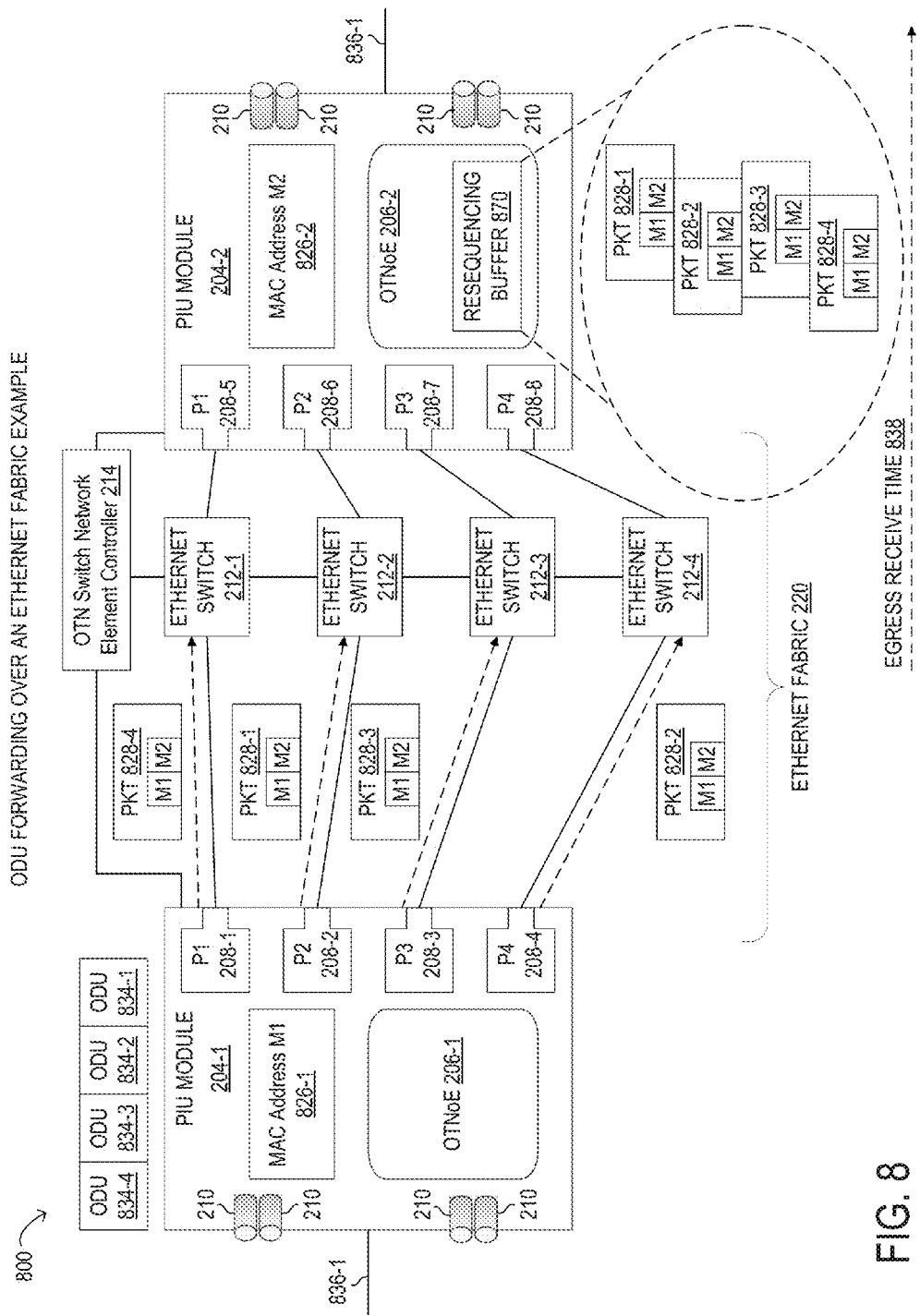
FIG. 8 is a block diagram of an example of optical data unit (ODU) forwarding over an embodiment of an Ethernet fabric.

Referring now to FIG. 8, a block diagram of an example of optical data unit (ODU) forwarding over Ethernet fabric 220 in an OTN switching system 800 is illustrated. In FIG.

8, OTN switching system 800 is shown in a schematic representation and is not drawn to scale or perspective. It is noted that, in different embodiments, OTN switching system 800 may be operated with additional or fewer elements.

In FIG. 8, optical data units (ODU) including ODU 834 may enter OTN switching system 800 in sequence (834-1, 834-2, 834-3, 834-4) at ingress PIU module 204-1, depicted by ODU switched connection 836-1 representing the arrival of in sequence ODUs 834 at ingress PIU module 204-1. ODU 834s may exit OTN switching system 800 at egress PIU module 204-2 in the same sequence as in ODU switched connection 836-1. In other words, ODU switched connection 836-1 maintains the same sequence of departure of ODU 834s at egress PIU module 204-2 as their in sequence arrival at ingress PIU module 204-1.

In FIG. 8, OTN switching system 800 may establish ODU switched connection 836-1 to enable ODU forwarding of Ethernet packets over Ethernet fabric 220 from PIU module 204-1 to PIU module 204-2. ODU switched connection 836-1 may include connections from each of ports 208 of ingress PIU module 204-1 to each of Ethernet switches 212 including the connection from port P1 208-1 to Ethernet switch 212-1, the connection from port P2 208-2 to Ethernet switch 212-2, the connection from port P1 208-3 to Ethernet switch 212-3, and the connection from port P1 208-4 to Ethernet switch 212-4. ODU switched connection 836-1 may also include connections from each of Ethernet switches 212 to each of ports 208 of egress PIU module 204-2 including the connection from Ethernet switch 212-1 to port 208-1, the connection from Ethernet switch 212-2 to port 208-2, the connection from Ethernet switch 212-3 to port 208-3, and the connection from Ethernet switch 212-4 to port 208-4. It is noted that in different embodiments, OTN switching system 800 may establish multiple ODU switched connections 836 (not shown in FIG. 8), each ODU switched connection 836 to enable ODU forwarding over Ethernet fabric 220 from one PIU module 204 of multiple PIU modules 204 to another PIU module 204 of multiple PIU modules 204.

OTNoE 206-1 of OTN switching system 800 may receive in sequence ODUs 834 at ingress PIU module 204-1. Each ODU 834 may include ODU header 224 having information that indicates an ingress (also referred herein as a source) PIU module 204 and an egress (also referred herein as a destination) PIU module 204. OTNoE 206-1 uses the information associated with each ODU 834 to determine the destination egress PIU module 204. In the example embodiment, ODUs 834 each include information that indicates ingress PIU module 204 is PIU module 204-1 and egress PIU module 204 is PIU module 204-2. It is noted that in different embodiments, ODU headers 224 of associated ODUs 834 each may include information that indicates the associated ingress PIU module 204 is the same or different amongst ODUs 834 and the associated egress PIU module 204 is the same or different amongst ODUs 834.

In OTN switching system 800, each PIU module 204 is assigned its own unique identifier. The unique identifier may be assigned by OTN switch network element controller 214 during a configuration process of OTN switching system 800 or by OTN switch network element controller 214 when each PIU module 204 is added to OTN switching system 800. PIU module identifier may be a media access control (MAC) address, a virtual local area network (VLAN) identifier, and the like. In the example embodiment, PIU module 204-1 is assigned MAC address M1 826-1 and PIU module 204-2 is assigned MAC address M2 826-2.

OTNoE 206-1 determines from information included in each ODU header 224 of associated ODUs 834 that the destination egress PIU module 204 is PIU module 204-2 and generates each Ethernet packet 828 (PKT) including PKT 828-1 through PKT 828-4 from each corresponding ODU 834-1 through ODU 834-4, respectively. In the example embodiment, there is a one to one correspondence between ODU 834-1 through ODU 834-4 and PKT 828-1 through PKT 828-4. Each generated PKT 828 includes an Ethernet switching header 222 which may include information from each ODU header 224 of associated ODUs 834. Each Ethernet switching header 222 of generated PKTs 828 may also include information that indicates the source MAC address of the ingress PIU module and the destination MAC address of the egress PIU module, where the source MAC address is MAC address M1 826-1 of ingress PIU module 204-1 and the destination MAC address is MAC address M2 826-2 of egress PIU module 204-2, as indicated by M1 and M2 of PKTs 828. The source and destination MAC addresses may be a unicast MAC address, a multicast MAC address, a broadcast MAC address, and the like. The generated PKTs 828 may further include a sequence number assigned to each PKT 828 that indicates the in sequence order of PKTs 828 that corresponds to the in sequence arrival order of ODUs 834. The sequence number of each packets is utilized by the destination egress PIU module 204 to recover and maintain the in sequence arrival order of ODUs 834 at PIU module 204-1, described in further detail below. The generated PKTs 828 may be for transmission via ODU switched connection 836-1 corresponding to ingress PIU module 204-1 and egress PIU module 204-2.

OTNoE 206-1 selects one of ports 208 for transmission of each PKT 828 of PKTs 828 and transmits each PKT 828 of PKTs 828 from its selected port 208 of PIU module 204-1 over Ethernet switch 212 corresponding to the selected port 208. In the example embodiment, OTNoE 206-1 selects port P1 208-1 for transmission of PKT 828-4 and transmits PKT 828-4 from port P1 208-1 over Ethernet switch 212-1, depicted by the dashed arrow from port P1 208-1 to Ethernet switch 212-1. Similarly, OTNoE 206-1 selects port P2 208-2 and transmits PKT 828-1 from port P2 208-2 over Ethernet switch 212-2, depicted by the dashed arrow from port P1 208-2 to Ethernet switch 212-2, selects port P3 208-3 and transmits PKT 828-3 from port P3 208-3 over Ethernet switch 212-3, depicted by the dashed arrow from port P3 208-3 to Ethernet switch 212-3, and selects port P4 208-4 and transmits PKT 828-2 from port P4 208-4 over Ethernet switch 212-4, depicted by the dashed arrow from port P4 208-4 to Ethernet switch 212-4. The connections between ports P1 208-1 through ports P4 208-4 and Ethernet switches 212-1 through 212-4 allow an ingress PIU module 204 to transmit PKTs 828 in parallel on all available Ethernet switches 212. When all N Ethernet switches 212 are available during normal operation, Ethernet fabric 220 is in a 0:N load sharing mode. When one of Ethernet switches 212 is unavailable, e.g. due to an equipment failure, an interconnect cable failure, or maintenance, an ingress PIU module 204 transmits PKTs 828 on all remaining available Ethernet switches 212, and therefore, realize fabric protection Ethernet switching.

OTNoE 206-2 may include a re-sequencing buffer 870 to store PKTs 828 received at ports 208 of PIU module 204-2. OTNoE 206-2 receives PKTs 828 from Ethernet switches 212 at ports 208 of PIU module 204-2 corresponding to ports P1 208 of PIU module 204-1 and stores PKTs 828 at re-sequencing buffer 870 of OTNoE 206-2. In the example embodiment, OTNoE 206-2 receives PKT 828-4 at port P1

208-5, PKT 828-1 at port P2 208-6, PKT 828-3 at port P3 208-7, and PKT 828-2 at port P4 208-8 and stores PKT 828-1 through PKT 828-4 at re-sequencing buffer 870. During operation, Ethernet fabric 220 may be in load sharing mode, where multiple PKTs 828 may be in transmission over multiple Ethernet switches 212 resulting in arrival packet jitter, which may be intrinsic packet jitter or extrinsic packet jitter.

Intrinsic packet jitter may be due to differences amongst PIU modules 204, interconnects, e.g. cables, Ethernet switches 212, and other components that may comprise OTN switching system 800. Extrinsic packet jitter may be due to multiple ingress PIU modules 204 transmitting multiple Ethernet packets 828 to the same port of the same egress PIU module 204 resulting in varied Ethernet packet arrival times. In other words, intrinsic packet jitter may be defined as originating from all causes other than Ethernet packet 828 collisions or retransmissions, which may be defined as causes for extrinsic packet jitter. In particular, OTN switching system 800 is designed and operated to minimize or eliminate extrinsic packet jitter, such that variations in egress receive time 838 may be assumed to be relatively small and originate from intrinsic packet jitter.

Ethernet fabric 220 operating in load sharing mode may result in Ethernet packets 828 arriving at ports 208 of PIU module 204-2 out of sequence to their transmission sequence from PIU module 204-1. In the example embodiment, PKT 828-1 arrives first as depicted by its arrival time with respect to egress receive time 838, PKT 828-3 arrives next, PKT 828-2 arrives next, and PKT 828-4 arrives last. As illustrated, PKTs 828 also overlap each other with respect to egress receive time 838.

OTNoE 206-2 re-assembles ODU 834-1 through ODU 834-4 including re-assembling each ODU header 224 of each ODU 834 from PKT 828-1 through PKT 828-4 stored at re-sequencing buffer 870. OTNoE 206-2 re-sequences ODU 834-1 through ODU 834-4 into the same sequence that corresponds to the in sequence arrival order of ODUs 834 at PIU module 204-1 based on the sequence number assigned to each PKT 828 that corresponds to the in sequence arrival order of ODUs 834. OTNoE 206-2 re-assembles each ODU header 224 of each ODU 834 based on information included in each Ethernet switching header 222 of each PKT 828. Once the ODUs 834 are re-assembled and re-sequenced, the ODUs 834 may exit OTN switching system 800 at egress PIU module 204-2 in the same sequence as they entered OTN switching system 800 at ingress PIU module 204-1.

Figure 9:
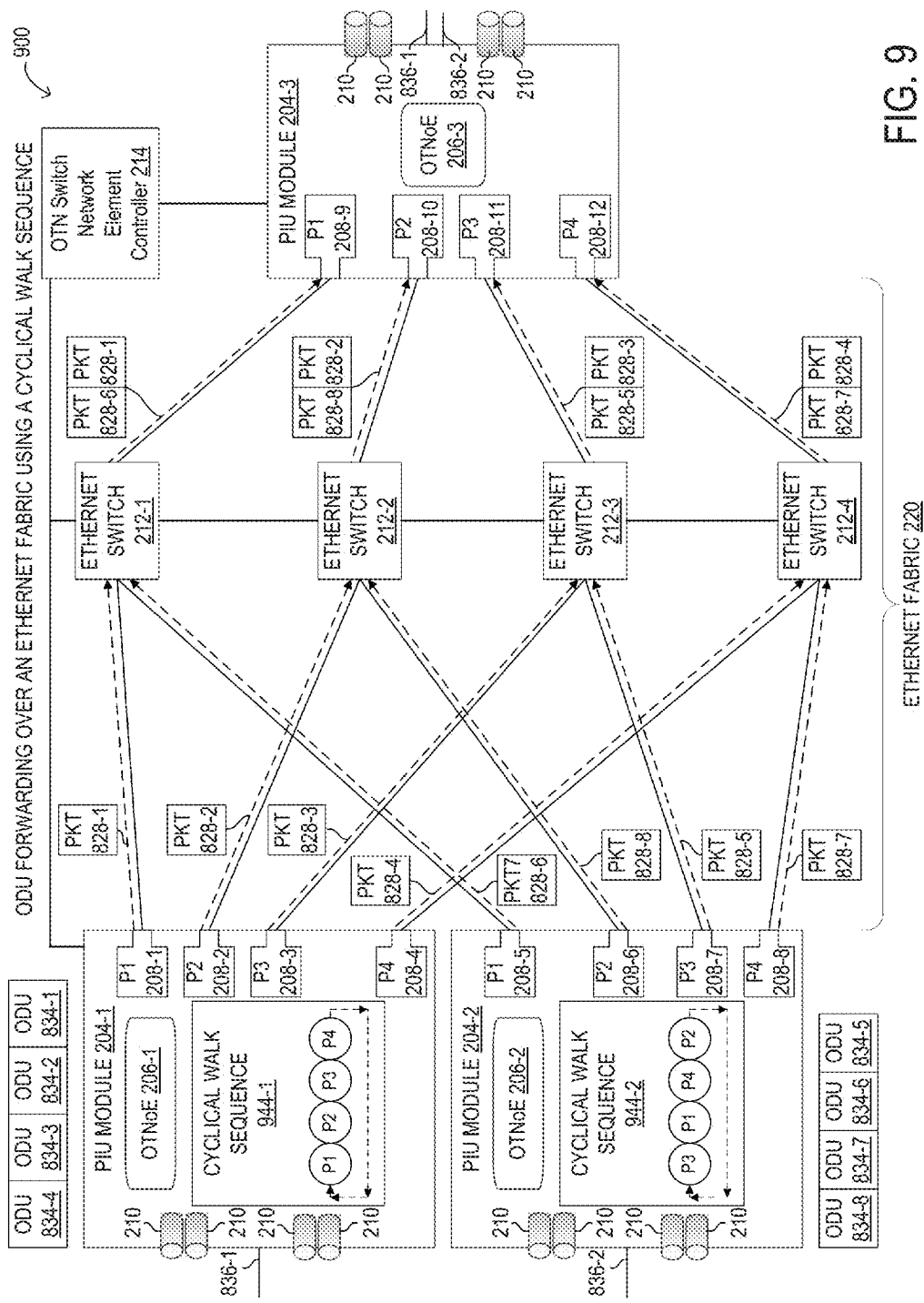
FIG. 9 is a block diagram of an example of ODU forwarding using a cyclical walk sequence over an embodiment of an Ethernet fabric in an OTN switching system.

Referring now to FIG. 9, a block diagram of an example of ODU 834 forwarding using a cyclical walk sequence over an embodiment of Ethernet fabric 220 in an OTN switching system 900 is illustrated. In FIG. 9, OTN switching system 900 is shown in a schematic representation and is not drawn to scale or perspective. It is noted that, in different embodiments, OTN switching system 900 may be operated with additional or fewer elements.

In one or more embodiments, OTN switching system 900 may establish one or more ODU switched connections 836 to enable ODU forwarding of Ethernet packets 828 over Ethernet fabric 220 from one or more ingress PIU modules 204 to one or more egress PIU modules 204, as previously described. In the example embodiment, OTN switching system 900 may establish a first ODU switched connection 836-1 from ingress PIU module 204-1 to egress PIU module 204-3 and a second ODU switched connection 836-2 from ingress PIU module 204-2 to egress PIU module 204-3. The first ODU switched connection 836-1 includes connections from each of ports P1 208-1 through P4 208-4 of ingress PIU module 204-1 to each of the corresponding Ethernet switches 212-1 through 212-4, and connections from each of Ethernet switches 212-1 through 212-4 to each of the corresponding ports P1 208-9 through P4 208-12 of egress PIU module 204-3. Similarly, the second ODU switched connection 836-2 includes connections from each of ports P1 208-5 through P4 208-8 of ingress PIU module 204-2 to each of the corresponding Ethernet switches 212-1 through 212-4, and connections from each of Ethernet switches 212-1 through 212-4 to each of the corresponding ports P1 208-9 through P4 208-12 of egress PIU module 204-3.

In one or more embodiments, ingress PIU module 204 having ODU switched connection 836 may utilize a method to select an Ethernet switch 212 of a number M of Ethernet switches 212 (also referred herein as an Ethernet plane) for Ethernet packet transmissions based on cyclical walk sequence 944, where cyclical walk sequence 944 is associated with ODU switched connection 836. Cyclical walk sequence 944 may include a sequential order of a number M unique port identifiers, where each of the M port identifiers are respectively associated with each of M ports 208 of ingress PIU module 212. The M unique port identifiers may be in one of a number N different possible sequential orders in the cyclical walk sequence 944, where the N different sequential orders is equal to M factorial divided by M (M!/M). In an embodiment of the method, ingress PIU module 204 may select a first port 208 through an $M^{th}$ port 208 of ingress PIU module 204 and their corresponding first through $M^{th}$ Ethernet switches 212 for transmission of first through $M^{th}$ in sequence Ethernet packets 828 based on first through $M^{th}$ in sequence port identifiers of cyclical walk sequence 944. Ingress PIU module 204 may similarly select a next port 208 and its next Ethernet switch 212 for transmission of the $M+1^{th}$ in sequence Ethernet packet 828 based on the first in sequence port identifier of cyclical walk sequence 944, where the method wraps from the $M^{th}$/last in sequence port identifier back to the first in sequence port identifier of cyclical walk sequence 944. In another embodiment of the method, the port selection may be based on a random port identifier of cyclical walk sequence 944.

In one or more embodiments, an ingress PIU module 204 is assigned a cyclical walk sequence 944 for each OTN switched connection 836 of ingress PIU module 204. In an embodiment, an egress PIU module 204 selects a cyclical walk sequence 944 and sends it to ingress PIU module 204, where it is received and stored at ingress PIU module 204. In another embodiment, OTN switch network element controller 214, on behalf of egress PIU module 204, selects cyclical walk sequence 944 to be stored at egress PIU module 204. In FIG. 9, egress PIU module 204-3 selects the first cyclical walk sequence 944-1 for PIU module 204-1 and the second cyclical walk sequence 944-2 for PIU module 204-2.

When multiple ODU switched connections 836 of multiple ingress PIU modules 204 each specify a single egress PIU module 204, each ingress PIU module 204 may utilize its assigned cyclical walk sequence 944 to avoid each ingress PIU module 204 from synchronizing its selection of the same Ethernet switch 212 with the other ingress PIU modules 204 and inundating the single egress PIU module 204 with Ethernet packets 828 from the same Ethernet switch 212. By assigning different cyclical walk sequences 944 to each ingress PIU module 204, the probability of synchronization of Ethernet switch selection may be minimized allowing OTN switching system 900 to use smaller buffers to endure a sizable influx of Ethernet packets 828 when ingress PIU modules 204 do synchronize their Ethernet switch selections.

In one or more embodiments, ingress PIU module 204 may maintain a consecutive transmission port count for each port 208 of ingress PIU module 204. Each consecutive transmission port count is based on consecutive Ethernet packet 828 transmissions to a single port 208, where Ethernet packet 828 transmissions are associated with different Ethernet switched connections 836. When ingress PIU module 204 determines that it is transmitting an Ethernet packet 828 to the same port 208 of ingress PIU module 204, the associated consecutive transmission port count is incremented.

When the ingress PIU module 204 is selecting the next port 208 for transmission of an in sequence Ethernet packet 828 based on the current in sequence port identifier of cyclical walk sequence 944, and ingress PIU module 204 determines that the consecutive transmission port count exceeds a consecutive transmission port count threshold value associated with the next port 208, PIU module 204 skips the current in sequence port identifier and selects the next port 208 based on the next in sequence port identifier of cyclical walk sequence 944. Selecting ports 208 in the above manner further minimizes the probability of synchronization of Ethernet switch 212 selection may be minimized In FIG. 9, OTN switching system 900 may select, for ingress PIU module 204-1, a first cyclical walk sequence 944-1 having a first sequential order of ports P1 208-1 through P4 208-4 for ODU forwarding of Ethernet packets PKT 228-1 through PKT 228-4 from ingress PIU module 204-1 to egress PIU module 204-3, where the first cyclical walk sequence 944-1 corresponds to the first ODU switched connection 836-1, ports P1 208-1 through P4 208-4 of PIU module 204-1 correspond to Ethernet switches 212-1 through 212-4, and each PKT 228-1 through PKT 228-4 correspond to ODU 834-1 through ODU 834-4, respectively. Similarly, OTN switching system 900 may select, for ingress PIU module 204-2, a second cyclical walk sequence 944-2 having a second sequential order of ports P1 208-5 through P4 208-8 for ODU forwarding of Ethernet packets PKT 228-5 through PKT 228-8 from ingress PIU module 204-2 to egress PIU module 204-3, where the second cyclical walk sequence 944-2 corresponds to the second ODU switched connection 836-2, ports P1 208-5 through P4 208-8 of PIU module 204-2 correspond to Ethernet switches 212-1 through 212-4, and each PKT 228-5 through PKT 228-8 correspond to ODU 834-5 through ODU 834-8, respectively.

In FIG. 9, the first cyclical walk sequence 944-1 having four port identifiers in the first sequential order of P1, P2, P3, and P4, where port identifier P1 corresponds to P1 208-1 and Ethernet switch 212-1, port identifier P2 corresponds to P2 208-2 and Ethernet switch 212-2, port identifier P3 corresponds to P3 208-3 and Ethernet switch 212-3, and port identifier P4 corresponds to P4 208-4 and Ethernet switch 212-4. The second cyclical walk sequence 944-2 having four port identifiers in the second sequential order of P3, P1, P4, and P2, where port identifier P1 corresponds to P1 208-5 and Ethernet switch 212-1, port identifier P2 corresponds to P2 208-6 and Ethernet switch 212-2, port identifier P3 corresponds to P3 208-7 and Ethernet switch 212-3, and port identifier P4 corresponds to P4 208-8 and Ethernet switch 212-4. The first sequential order and the second sequential order are two of six possible sequential orders of four port identifiers, 4 factorial divided by 4 (4!/4).

In FIG. 9, OTNoE 206-1 of OTN switching system 900 may receive in sequence ODUs 834-1 through 834-4 at ingress PIU module 204-1 and OTNoE 206-2 may receive in sequence ODUs 834-5 through 834-8 at ingress PIU module 204-2. ODUs 834-1 through 834-4 and 834-5 through 834-8 may have constant data bit rate, and may be well behaved because ODU switched connections 836 allow transmissions of Ethernet packets 828 from a number M of ports 208 of an ingress PIU module 204 to M Ethernet switches 212 at matching data rates, which may result in minimal congestion that could cause delay variations to the recovery of ODUs 834 at an egress PIU module 204. OTNoE 206-1 generates PKTs 828-1 through 828-4 corresponding to ODUs 834-1 through 834-4, where ODUs 834-1 through 834-4 are for transmission via the first ODU switched connection 836-1. OTNoE 206-2 similarly generates PKTs 828-5 through 828-8 corresponding to ODUs 834-5 through 834-8, where ODUs 834-5 through 834-8 are for transmission via the second ODU switched connection 836-2.

OTNoE 206-1 may transmit the first PKT 828-1 from port P1 208-1 of ingress PIU module 204-1 to egress PIU module 204-3 via Ethernet switch 212-1, where port P1 208-1 may be selected based on the first port identifier, P1, in the first sequential order of the first cyclical walk sequence 944-1. OTNoE 206-1 may transmit the second, third, and fourth PKTs 828-2 through 828-4 from ports P2 208-2, P3 208-3, and P4 208-4 of ingress PIU module 204-1 to egress PIU module 204-3 via Ethernet switches 212-2, 212-3, and 212-4, where ports P2 208-2, P3 208-3, and P4 208-4 may be selected based on the second, third, and fourth port identifiers, P2, P3, and P4 in the first sequential order of the first cyclical walk sequence 944-1. OTNoE 206-1 may transmit the next in-sequence PKT 828 from port P1 208-1, where P1 208-1 may be selected based on wrapping around from the 4th/last in-sequence port identifier P4 to 1st/next port identifier P1 in the first sequential order of the first cyclical walk sequence 944-1.

Similarly, OTNoE 206-2 may transmit the first, second, third, and fourth PKTs 828-5 through 828-8 from ports P3 208-7, P1 208-5, P4 208-8, and P2 208-6 of ingress PIU module 204-2 to egress PIU module 204-3 via Ethernet switches 212-3, 212-1, 212-4, and 212-2 where ports P3 208-7, P1 208-5, P4 208-8, and P2 208-6 may be selected based on the first, second, third, and fourth port identifiers, P3, P1, P4, and P2 in the second sequential order of the second cyclical walk sequence 944-2. OTNoE 206-2 may transmit the next in-sequence PKT 828 from port P3 208-7, where P3 208-7 may be selected based on wrapping around from the 4th/last in-sequence port identifier P2 to 1 st/next port identifier P3 in the second sequential order of the second cyclical walk sequence 944-2. In FIG. 9, the transmission of PKTs 828-1 through 828-4 from each selected port 208 of ingress PIU module 204-1 to Ethernet switches 212 and PKTs 828-5 through 828-8 from each selected port 208 of ingress PIU module 204-2 to Ethernet switches 212 are shown by dashed line arrows between each selected port 208 and each corresponding Ethernet switch 212.

In FIG. 9, OTNoE 206-3 of egress PIU module 204-3 may receive PKTs 828-1 and 828-6 from ingress PIU modules 204-1 and 204-2 via Ethernet switch 212-1 at port P1 208-9, depicted by the dashed arrow from Ethernet switch 212-1 to port P1 208-9, PKTs 828-2 and 828-8 from Ethernet switch 212-2 at port P2 208-10, depicted by the dashed arrow from Ethernet switch 212-2 to port P1 208-10, PKTs 828-3 and 828-5 from Ethernet switch 212-3 at port P3 208-11, depicted by the dashed arrow from Ethernet switch 212-3 to port P1 208-11, and PKTs 828-4 and 828-7 from Ethernet switch 212-4 at port P4 208-12, depicted by the dashed arrow from Ethernet switch 212-4 to port P1 208-12.

Figure 10:
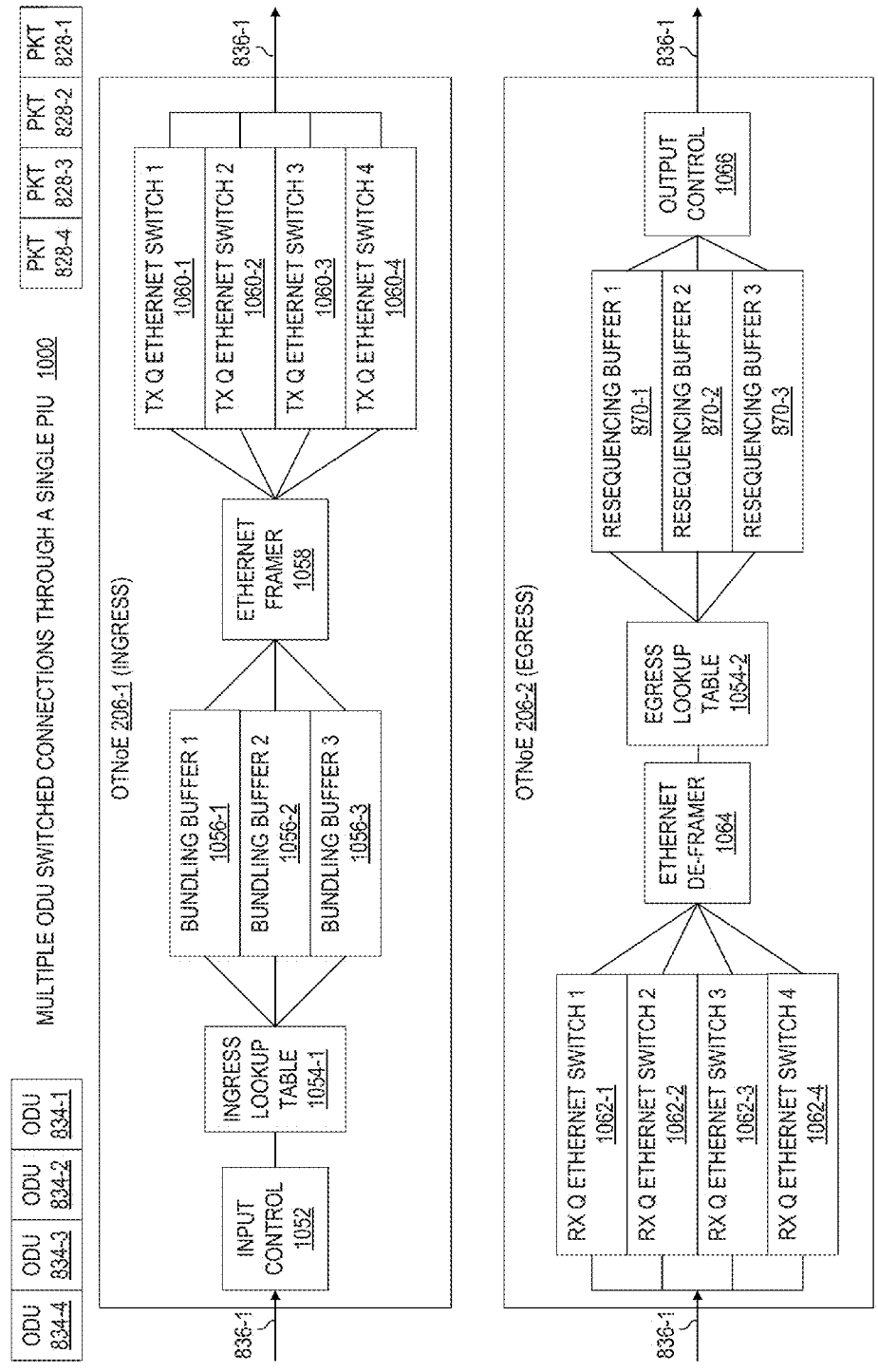
FIG. 10 is a block diagram of multiple ODU switched connections through an embodiment of a single PIU module.

Referring now to FIG. 10, a block diagram of an example of multiple ODU switched connections 836 through a single PIU module 204 in an OTN switching system 1000 is illustrated. In FIG. 10, OTN switching system 1000 is shown in a schematic representation and is not drawn to scale or perspective. It is noted that, in different embodiments, OTN switching system 1000 may be operated with additional or fewer elements.

In OTN switching system 1000, multiple ODUs 834 may be bundled into a single Ethernet packet 828 to minimize the latency of Ethernet packet transmissions over Ethernet fabric 220 and minimize the memory required for these transmissions. Only ODUs 834 associated with the same Ethernet switched connection 836 may be bundled into a single Ethernet packet PKT 828. The in sequence order of the ODUs 834 are bundled into the same Ethernet packet PKT 828 in in-sequence order.

OTNoE 206-1 and 206-2 may utilize ingress lookup table 1054-1 and egress lookup tables 1054-2, respectively, with local indexing to allow table lookup functions to be deterministic within a single lookup cycle, as described in further detail below. When OTNoEs 206 are implemented as field programmable gate arrays (FPGA) and operated in this manner the FPGA memory requirements may be reduced. OTN switching system 1000 has a system wide look up table of Ethernet switched connections 836 having a respective Ethernet switched connection 836 identification that includes entries for every Ethernet switched connection 836 for every ingress PIU module 204 and egress PIU module 204 in OTN switching system 1000. To enable efficient table lookup functions to be performed by OTNoEs 206, each OTNoE 206 has a local ingress lookup table 1054-1 and an egress lookup table 1054-2 that are based on a portion of the system wide lookup table, where the local ingress lookup table 1054-1 includes entries for the Ethernet switched connections 836 associated with PIU module 204-1 and its associated egress PIU module 204-2, and the local egress lookup table 1054-2 includes entries for the Ethernet switched connections 836 associated with egress PIU module 204-2 and its associated ingress PIU modules 204-1. By distributing the system wide lookup table to a local ingress lookup table 1054-1 for ingress OTNoE 206-1 and a local egress lookup table 1054-2 for egress OTNoE 206-2, the size of the local tables are reduced and the lookup functions performed using these local lookup tables 1054 can be more efficient and deterministic.

OTNoE 206-1 of OTN switching system 1000 may receive a first ODU 834-1 having a first ODU header 224-1 at an input control 1052, where the first ODU header 224-1 includes information that indicates PIU module 204-2 is the destination egress PIU module 204-2 of the first ODU 834-1. Input control 1052 may perform a table lookup of ingress lookup table 1054-1 (ILT) having a plurality of ILT entries to retrieve a first ILT entry based on egress PIU module 204-2 being the destination egress PIU module 204-2 of the first ODU 834-1. In an embodiment, input control 1052 may perform the table lookup by using an ILT table index as a direct index to the first ILT entry of ILT 1054-1, where the ILT table index is based on egress PIU module 204-2. OTNoE 206-1 may store the first ODU 828 at a first location of a bundling buffer 1 1056-1, where information included in the first ILT entry indicates that bundling buffer 1 1056-1 is to be used to store ODUs 834 associated with egress PIU module 206-2.

OTNoE 206-1 may receive a second ODU 834-2 that indicates egress PIU module 204-2 is the destination egress PIU module 204-2. Input control 1052 may retrieve a second ILT entry of ILT 1054-1 based on ODU 834-2, as described above. OTNoE 206-1 may store the second ODU 834-2 at a next in sequence second location of bundling buffer 1 1056-1 based on the second ILT entry. Ethernet framer 1058 may generate a first Ethernet packet PKT 828-1 including a first Ethernet switching header 222-1 corresponding to the first ODU 834-1 and the second ODU 834-2 stored at the first and second locations of bundling buffer 1 1056-1 based on the first and second ILT entries, as previously described, where the first Ethernet switching header 222-1 includes a first sequence number, the first ILT table index, a first egress lookup table (ELT) index stored at the first ILT entry, and an Ethernet switched connection 836-1 stored at the first ILT entry. Ethernet framer 1058 may store the first Ethernet packet PKT 828-1 at a first transmit queue of a plurality of transmit queues including TX Q Ethernet Switch 1 1061-1 through TX Q Ethernet Switch 4 1061-1 for transmission to egress PIU module 206-2, where the first transmit queue TX Q Ethernet Switch 1 1061-1 is selected by OTNoE 206-1 based on cyclical walk sequence 944-1.

Ethernet de-framer 1064 of egress OTNoE 206-2 may retrieve the first Ethernet packet PKT 828-1 stored at a first receive queue of a plurality of receive queues including RX Q Ethernet Switch 1 1062-1 through RX Q Ethernet Switch 4 1061-4, where the first receive queue is RX Q Ethernet Switch 1 1062-1. OTNoE 206-2 may perform a table lookup of an ELT table 1054-2 having a plurality of ELT entries to retrieve a first ELT entry of ELT 1054-2 based on the first ELT index of the first Ethernet switching header 222-1. OTNoE 206-2 may store the first Ethernet packet PKT 828-1 at a first location of a re-sequencing buffer 870 of a plurality of re-sequencing buffers 870 including re-sequencing buffer 1 870-1 through re-sequencing buffer 3 870-3, where information included in the first ELT entry indicates that re-sequencing buffer 1 870-1 is to be used to store Ethernet packets PKT 828 associated with the first ELT entry, and the first location of re-sequencing buffer 1 870-1 is based on the first sequence number of the first Ethernet switching header 222-1 of PKT 828-1. Output control 1066 of OTNoE 206-2 may recover the first in sequence ODU 834-1 and the second in sequence ODU 834-2 from Ethernet packet PKT 828-1 based on information in Ethernet switching header 222-1 of PKT 828-1 for transmission to the OTN networking system 1000.

OTN switching system 1000 may provide an environment to enable ODU clock synchronization and clock recovery. In order to provide this environment, OTN switching system 1000 may provide a single clock source to both ingress PIU module 204-1 and egress PIU module 204-1 so that ingress OTN framer+switch 608-1 and egress OTN framer+switch 608-2 may use the sigma-delta clock recovery method to recover an ODU clock using timestamps and a number of bytes transferred from ingress OTN framer+switch 608-1 to egress OTN framer+switch 608-2. Ingress PIU module 204-1 and egress PIU module 204-1 synchronize their ODU clock interfaces to the single clock source provided by OTN switching system 1000, or derived from OTN overhead information to enable ODU clock recovery.

OTN switching system 1000 also provides in-sequence delivery of ODUs for each ODU path, between ingress OTN framer+switch 608-1 and egress OTN framer+switch 608-2, even when Ethernet fabric 220 may produce out of order delivery of Ethernet frames, as previously described.

OTN switching system 1000 further provides continuous ODU delivery to egress OTN framer+switch 608-2 in spite of any delays and jitters caused by Ethernet fabric 220, and buffers extra jitters that egress OTN framer+switch 608-2 may be unable to handle. There are two places that de-jittering of ODUs occurs, a limited capability is provided in egress OTN framer+switch 608-2 and in a re-sequencing buffer 870 on a per ODU path basis. Re-sequencing is performed on Ethernet packets 828 level. Once Ethernet packets 828 are re-assembled back in-sequence, Ethernet packet 828 overhead can be removed and ODUs are delivered to egress OTN framer+switch 608-2. In order to prevent re-sequencing buffer 870 underrun due to Ethernet fabric jitter, a watermark is set for each re-sequencing buffer 870 to allow buffering of some Ethernet packets 828 prior to delivery of ODUs to egress OTN framer+switch 608-2. Ethernet fabric jitter and Ethernet packet collision may also cause re-sequencing buffer 870 to build up beyond the watermark. In order to reduce internal memory requirements of OTNoE 206, re-sequencing buffers 870 are shared for all ODU paths of PIU modules 204, where re-sequencing buffers 870 may have buffer descriptors that are queued, linked, to allow for more efficient re-ordering. In OTN switching system 1000, per ODU path back-pressure may occur between egress OTN framer+switch 608-2 and re-sequencing buffer 870. Egress OTNoE 206-2 delivers ODUs 834 to egress OTN framer+switch 608-2. Egress OTN framer+switch 608-2 may utilize flow control to control the rate of emission of ODUs 834 for each specific ODU path from egress OTNoE 206-2.

Ingress OTN framer+switch 608-1 provides the number of bytes of each original ODU in each subsequent Ethernet packet header between two adjacent timestamps at egress OTN framer+switch 608-2, even in cases where there is ODU loss or ODU corruption. When an Ethernet packet 828 is lost, the number of bytes in the next Ethernet packet header of Ethernet packet 828 on the same ODU path will be used to deliver the number of bytes missing on the ODU stream. The content of the lost Ethernet packet 828 will be lost but the clock information can be recovered.

Figure 11:
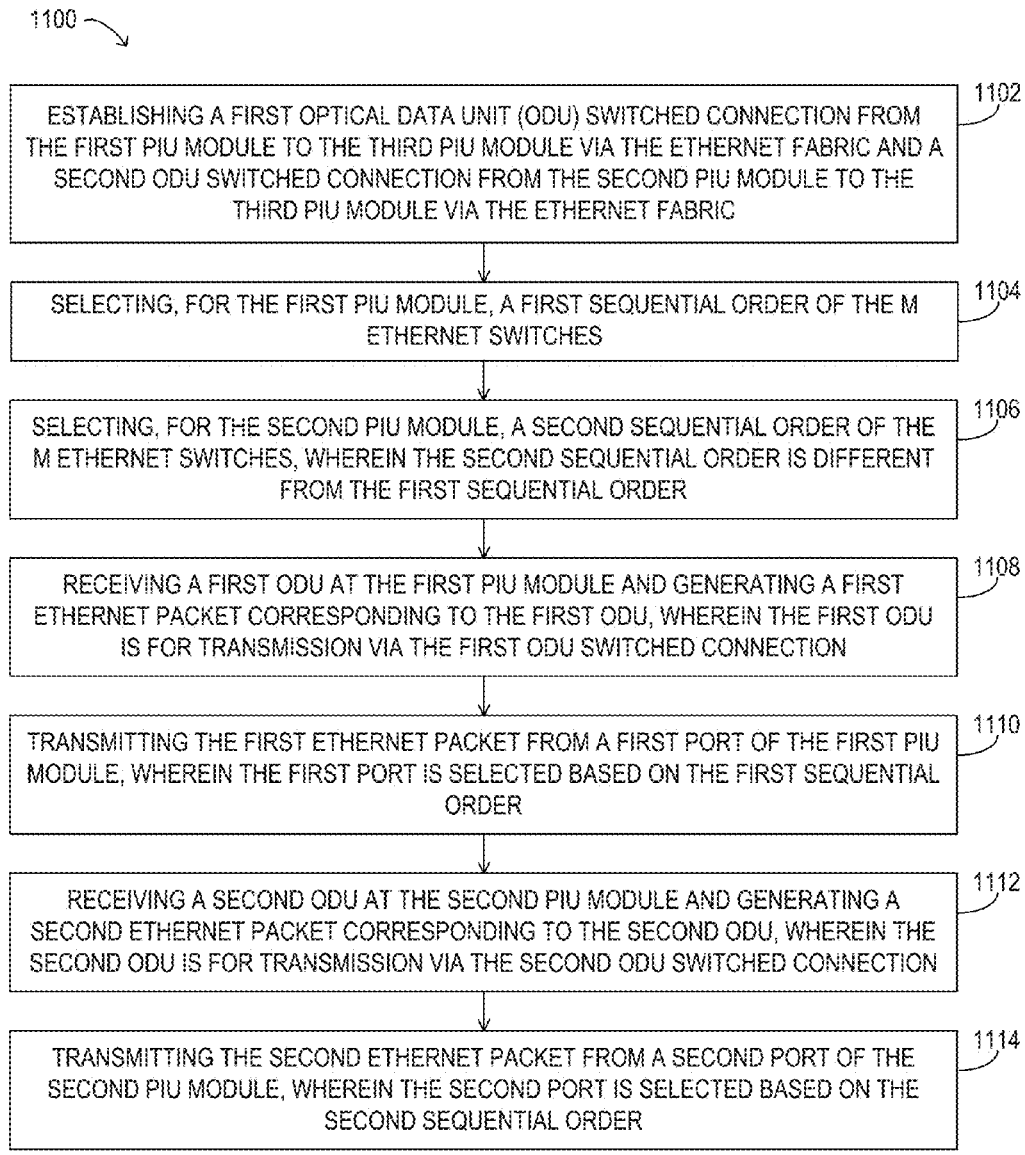
FIG. 11 a flowchart of selected elements of an embodiment of a method for switching optical signals as Ethernet packets.

Referring now to FIG. 11, a flowchart of selected elements of an embodiment of a method 1100 for switching optical signals as Ethernet packets 828, as described herein, is depicted. In various embodiments, method 1100 may be performed using disaggregated OTN switching systems 200, 1000 in an optical network, for example, corresponding to OTN switching system examples 800, 900. It is noted that certain operations described in method 1100 may be optional or may be rearranged in different embodiments.

Method 1100 may begin at step 1102 by establishing a first optical data unit (ODU) switched connection 836-1 from the first PIU module 204-1 to the third PIU module 204-3 via Ethernet fabric 220 and a second ODU switched connection 836-2 from the second PIU module 204-2 to the third PIU module 204-3 via Ethernet fabric 220. At step 1104, a first sequential order of the M Ethernet switches 212 is selected, for the first PIU module 204-1. At step 1106, a second sequential order of the M Ethernet switches 212 is selected, for the second PIU module 204-2, where the second sequential order is different from the first sequential order. At step 1108, a first ODU 834-1 at the first PIU module 204-1 is received and a first Ethernet packet 828-1 corresponding to the first ODU 834-1 is generated, where the first ODU 834-1 is for transmission via the first ODU switched connection 836-1. At step 1110, the first Ethernet packet 828-1 from a first port 208 of the first PIU module 204-1 is transmitted, where the first port 208 is selected based on the first sequential order. At step 1112, a second ODU 834-1 at the second PIU module 204-2 is received and a second Ethernet packet 828-2 corresponding to the second ODU 834-2 is generated, where the second ODU 834-2 is for transmission via the second ODU switched connection 836-2. At step 1114, transmitting the second Ethernet packet 828-2 from a second port 208 of the second PIU module 204-2, where the second port 208 is selected based on the second sequential order.

As disclosed herein, methods and systems for a disaggregated OTN switching system 200 include using PIU modules 204 for OTN to Ethernet transceiving and an Ethernet fabric 220 as a switching core. A customized OTN over Ethernet module 212 in PIU modules 204 enables various OTN functionality to be realized using Ethernet fabric 220.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for switching optical signals as Ethernet packets, the method comprising:
   in an optical transport networking (OTN) switching system further comprising:
      an Ethernet fabric having a number M of Ethernet switches, assigning a variable i having a value ranging from 1 to M to denote the ith Ethernet switch of the M Ethernet switches, wherein M is greater than one; and
      a plurality of plug-in universal (PIU) modules each having M PIU ports including a first PIU module, a second PIU module, and a third PIU module, wherein an ith PIU port of each of the plurality of PIU modules is connected to the ith Ethernet switch of the Ethernet fabric,
   establishing a first optical data unit (ODU) switched connection from the first PIU module to the third PIU module via the Ethernet fabric and a second ODU switched connection from the second PIU module to the third PIU module via the Ethernet fabric;
   selecting, for the first PIU module, a first sequential order of the M Ethernet switches;
   selecting, for the second PIU module, a second sequential order of the M Ethernet switches, wherein the second sequential order is different from the first sequential order;
   receiving a first ODU at the first PIU module and generating a first Ethernet packet corresponding to the first ODU, wherein the first ODU is for transmission via the first ODU switched connection;
   transmitting the first Ethernet packet from a first port of the first PIU module, wherein the first port is selected based on the first sequential order;
   receiving a second ODU at the second PIU module and generating a second Ethernet packet corresponding to the second ODU, wherein the second ODU is for transmission via the second ODU switched connection; and
   transmitting the second Ethernet packet from a second port of the second PIU module, wherein the second port is selected based on the second sequential order.

2. The method of claim 1, wherein the first sequential order and the second sequential order each specify M number of port identifiers respectively associated with the first PIU module and the second PIU module.

3. The method of claim 1, wherein selecting the first sequential order and selecting the second sequential order is performed at the third PIU module, and further comprising:
- sending the first sequential order from the third PIU module to the first PIU module; and
- sending the second sequential order from the third PIU module to the second PIU module.

4. The method of claim 1, further comprising:
- receiving a third ODU at the first PIU module;
- performing, for the first PIU module, a table lookup of an ingress lookup table (ILT) having a plurality of ILT entries to retrieve a first ILT entry associated with the third ODU;
- storing, for the first PIU module, the third ODU at a first location of a first bundling buffer associated with the first ILT entry;
- receiving a fourth ODU at the first PIU module;
- performing, for the first PIU module, a table lookup of the ILT to retrieve a second ILT entry of the ILT associated with the fourth ODU;
- storing, for the first PIU module, the fourth ODU at a next in sequence second location of the first bundling buffer associated with the second ILT entry; and
- generating, for the first PIU module, a third Ethernet packet corresponding to the third ODU and the fourth ODU at the first bundling buffer associated with the first ILT entry and second ILT entry.

5. The method of claim 4, further comprising:
- storing, for the first PIU module, the third Ethernet packet at a first transmit queue for transmission to the third PIU module based on the first sequential order.

6. The method of claim 4, further comprising:
- retrieving, for the third PIU module, the third Ethernet packet stored at a first receive queue;
- retrieving, for the third PIU module, the third ODU and the fourth ODU from the third Ethernet packet; and
- performing, for the third PIU module, a table lookup of an egress lookup table (ELT) having a plurality of ELT entries to retrieve a first ELT entry associated with the third Ethernet packet.

7. The method of claim 6, further comprising:
- storing, for the third PIU module, the third ODU and the fourth ODU at a first location of a first re-sequencing buffer associated with the first ELT entry based on a first Ethernet packet sequence number of the third Ethernet packet.

8. The method of claim 1, further comprising:
- establishing a third ODU switched connection from the first PIU module to the third PIU module via the Ethernet fabric;
- receiving a third ODU at the first PIU module, wherein the third ODU is for transmission via the third ODU switched connection; and
- transmitting a third Ethernet packet corresponding to the third ODU from a third port of the first PIU module, wherein the third port is selected based on a consecutive transmission port count.

9. The method of claim 8, wherein the third ODU switched connection is different than the first ODU switched connection.

10. The method of claim 8, wherein the consecutive transmission port count is based on consecutive transmissions to a single port.

11. An optical transport networking (OTN) switching system comprising:
- an Ethernet fabric having a number M of Ethernet switches, wherein a variable i having a value ranging from 1 to M to denote the ith Ethernet switch of the M Ethernet switches, and wherein M is greater than one; and
- a plurality of plug-in universal (PIU) modules each having M PIU ports including a first PIU module, a second PIU module, and a third PIU module, wherein an ith PIU port of each of the plurality of PIU modules is connected to the ith Ethernet switch of the Ethernet fabric, the OTN switching system to:
- establish a first optical data unit (ODU) switched connection from the first PIU module to the third PIU module via the Ethernet fabric and a second ODU switched connection from the second PIU module to the third PIU module via the Ethernet fabric;
- select a first sequential order of the M Ethernet switches;
- select a second sequential order of the M Ethernet switches, wherein the second sequential order is different from the first sequential order;
- receive a first ODU at the first PIU module and generate a first Ethernet packet corresponding to the first ODU, wherein the first ODU is for transmission via the first ODU switched connection;
- transmit the first Ethernet packet from a first port of the first PIU module, wherein the first port is selected based on the first sequential order;
- receive a second ODU at the second PIU module and generate a second Ethernet packet corresponding to the second ODU, wherein the second ODU is for transmission via the second ODU switched connection; and
- transmit the second Ethernet packet from a second port of the second PIU module, wherein the second port is selected based on the second sequential order.

12. The OTN switching system of claim 11, wherein the first sequential order and the second sequential order each specify M number of port identifiers respectively associated with the first PIU module and the second PIU module.

13. The OTN switching system of claim 11, wherein the selection of the first sequential order and the selection of the second sequential order is performed at the third PIU module, and further comprising:
- send the first sequential order from the third PIU module to the first PIU module; and
- send the second sequential order from the third PIU module to the second PIU module.

14. The OTN switching system of claim 11, further comprising:
- receive a third ODU at the first PIU module;
- perform a table lookup of an ingress lookup table (ILT) having a plurality of ILT entries to retrieve a first ILT entry associated with the third ODU;
- store the third ODU at a first location of a first bundling buffer associated with the first ILT entry;
- receive a fourth ODU at the first PIU module;
- perform a table lookup of the ILT to retrieve a second ILT entry of the ILT associated with the fourth ODU;
- store the fourth ODU at a next in sequence second location of the first bundling buffer associated with the second ILT entry; and
- generate a third Ethernet packet corresponding to the third ODU and the fourth ODU at the first bundling buffer associated with the first ILT entry and the second ILT entry.

15. The OTN switching system of claim 14, further comprising:
- store the third Ethernet packet at a first transmit queue for transmission to the third PIU module based on the first sequential order.

16. The OTN switching system of claim 14, further comprising:
retrieve the third Ethernet packet stored at a first receive queue;
retrieve the third ODU and the fourth ODU from the third Ethernet packet; and
perform a table lookup of an egress lookup table (ELT) having a plurality of ELT entries to retrieve a first ELT entry associated with the third Ethernet packet.

17. The OTN switching system of claim 16, further comprising:
store the third ODU and the fourth ODU at a first location of a first re-sequencing buffer associated with the first ELT entry based on a first Ethernet packet sequence number of the third Ethernet packet.

18. The OTN switching system of claim 11, further comprising:
establish a third ODU switched connection from the first PIU module to the third PIU module via the Ethernet fabric;
receive a third ODU at the first PIU module, wherein the third ODU is for transmission via the third ODU switched connection; and
transmit a third Ethernet packet corresponding to the third ODU from a third port of the first PIU module, wherein the third port is selected based on a consecutive transmission port count.

19. The OTN switching system of claim 18, wherein the third ODU switched connection is different than the first ODU switched connection.

20. The OTN switching system of claim 18, wherein the consecutive transmission port count is based on consecutive transmissions to a single port.

* * * * *